US012628002B2

(12) United States Patent
Li et al.

(10) Patent No.: US 12,628,002 B2
(45) Date of Patent: May 12, 2026

(54) BEAM INDICATION METHOD, TERMINAL, NETWORK-SIDE DEVICE, AND STORAGE MEDIUM

(71) Applicant: DATANG MOBILE COMMUNICATIONS EQUIPMENT CO., LTD., Beijing (CN)

(72) Inventors: Hui Li, Beijing (CN); Runhua Chen, Beijing (CN); Qiubin Gao, Beijing (CN); Yajuan Luo, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 431 days.

(21) Appl. No.: 18/250,301

(22) PCT Filed: Oct. 20, 2021

(86) PCT No.: PCT/CN2021/125092
§ 371 (c)(1),
(2) Date: Apr. 24, 2023

(87) PCT Pub. No.: WO2022/083658
PCT Pub. Date: Apr. 28, 2022

(65) Prior Publication Data
US 2023/0403570 A1 Dec. 14, 2023

(30) Foreign Application Priority Data
Oct. 23, 2020 (CN) .......................... 202011149721.0

(51) Int. Cl.
*H04W 16/28* (2009.01)
*H04B 7/06* (2006.01)
*H04W 52/14* (2009.01)
(52) U.S. Cl.
CPC ........ *H04W 16/28* (2013.01); *H04B 7/06968* (2023.05); *H04W 52/146* (2013.01)

(58) Field of Classification Search
CPC ... H04W 16/28; H04W 72/23; H04W 72/232; H04W 52/08; H04W 52/10;
(Continued)

(56) References Cited

U.S. PATENT DOCUMENTS

2019/0261281 A1 8/2019 Jung et al.
2020/0196383 A1 6/2020 Tsai et al.
(Continued)

FOREIGN PATENT DOCUMENTS

CN 110958038 A 4/2020
CN 111147211 A 5/2020
(Continued)

OTHER PUBLICATIONS

International Search Report mailed on Jan. 10, 2022 for PCT application PCT/CN2021/125092.
(Continued)

*Primary Examiner* — Tu X Nguyen
(74) *Attorney, Agent, or Firm* — Harness, Dickey & Pierce, P.L.C.

(57) ABSTRACT

A beam indication method includes: receiving a beam indication message from a base station, in which the beam indication message includes a first transmission configuration indication (TCI) state ID; obtaining a first TCI state corresponding to the first TCI state ID from a TCI state pool, in which an information field of the first TCI state at most includes two groups of source RS information for indicating beam directions; and determining a beam direction corresponding to an uplink channel and/or a downlink channel based on the source RS information for indicating beam directions.

17 Claims, 6 Drawing Sheets

(58) Field of Classification Search
      CPC . H04W 52/143; H04W 72/046; H04W 76/27;
                         H04W 72/543; H04W 72/02
      See application file for complete search history.

(56) References Cited

U.S. PATENT DOCUMENTS

| | | |
|---|---|---|
| 2020/0314858 A1 | 10/2020 | Xu et al. |
| 2022/0247538 A1* | 8/2022 | Farag .................... H04L 5/0023 |
| 2023/0291525 A1* | 9/2023 | Zhou ...................... H04B 7/088 |

FOREIGN PATENT DOCUMENTS

| | | |
|---|---|---|
| CN | 111586858 A | 8/2020 |
| WO | 2020/144637 A1 | 7/2020 |
| WO | 2020/165702 A1 | 8/2020 |
| WO | 2022/146603 A1 | 7/2022 |

OTHER PUBLICATIONS

Office Action issued Jul. 13, 2022 for Taiwanese application 110138786.

Zte, "Enhancements on Multi-beam Operation," 3GPP TSG RAN WG1 Meeting #102-e R1-2005454, Aug. 8, 2020.

Gao et al., "Analysis on massive beamforming in the 5G NR," Information and Communications Technology and Policy No. 11, Nov. 30, 2018.

Ericsson, "On beam indication, measurement, and reporting," 3GPP TSG-RAN WG1 #90bis, R1-1718433, Oct. 13, 2017.

Extended Search Report issued Apr. 2, 2024 in European application 21882073.6.

ZTE, "Enhancements on multi-beam operation," 3GPP TSG RAN WG1 Meeting #98, R1-1908192, Aug. 17, 2019.

* cited by examiner

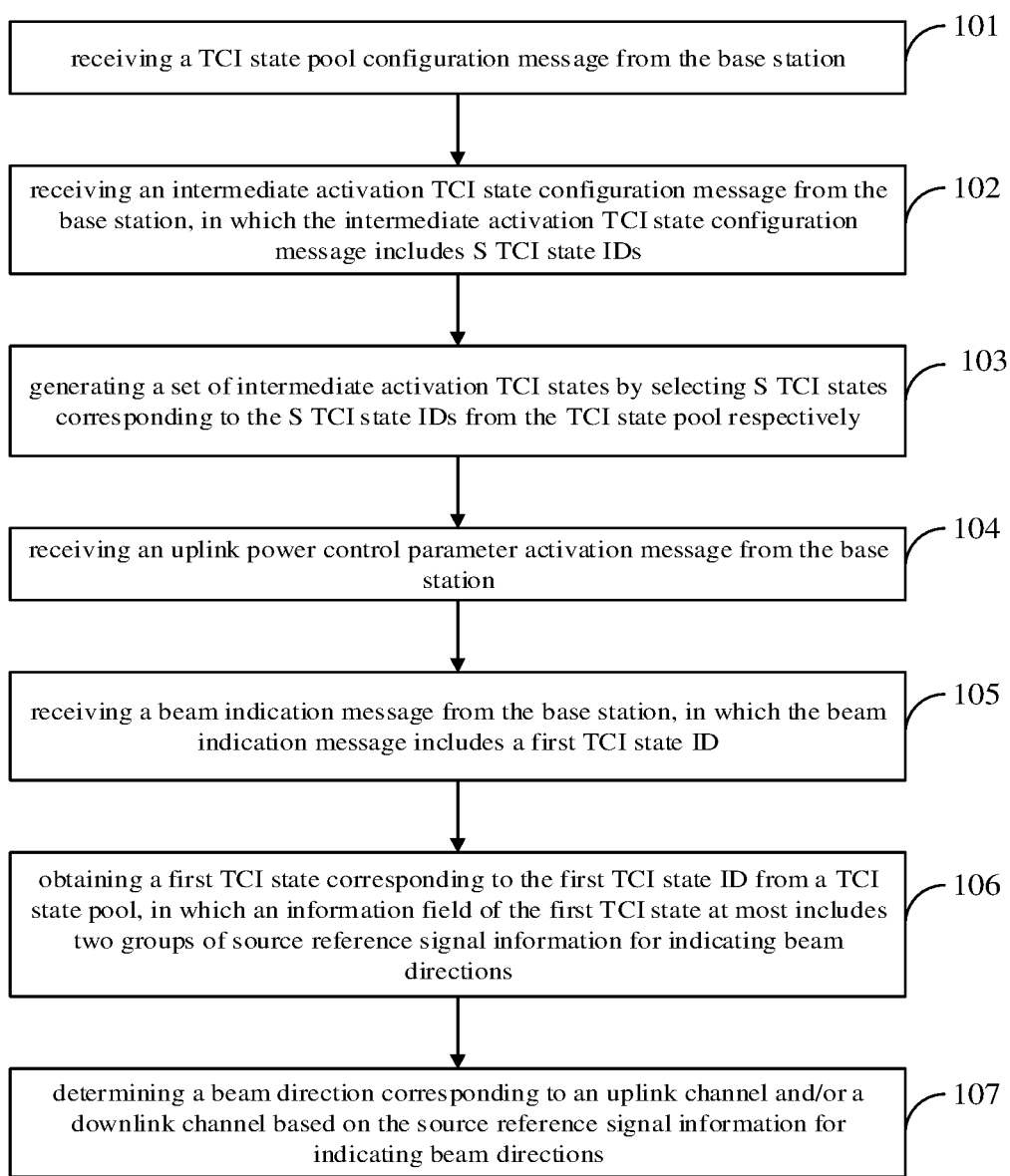

receiving a TCI state pool configuration message from the base station — 101 receiving an intermediate activation TCI state configuration message from the base station, in which the intermediate activation TCI state configuration message includes S TCI state IDs — 102 generating a set of intermediate activation TCI states by selecting S TCI states corresponding to the S TCI state IDs from the TCI state pool respectively — 103 receiving an uplink power control parameter activation message from the base station — 104 receiving a beam indication message from the base station, in which the beam indication message includes a first TCI state ID — 105 obtaining a first TCI state corresponding to the first TCI state ID from a TCI state pool, in which an information field of the first TCI state at most includes two groups of source reference signal information for indicating beam directions — 106 determining a beam direction corresponding to an uplink channel and/or a downlink channel based on the source reference signal information for indicating beam directions — 107

FIG. 1

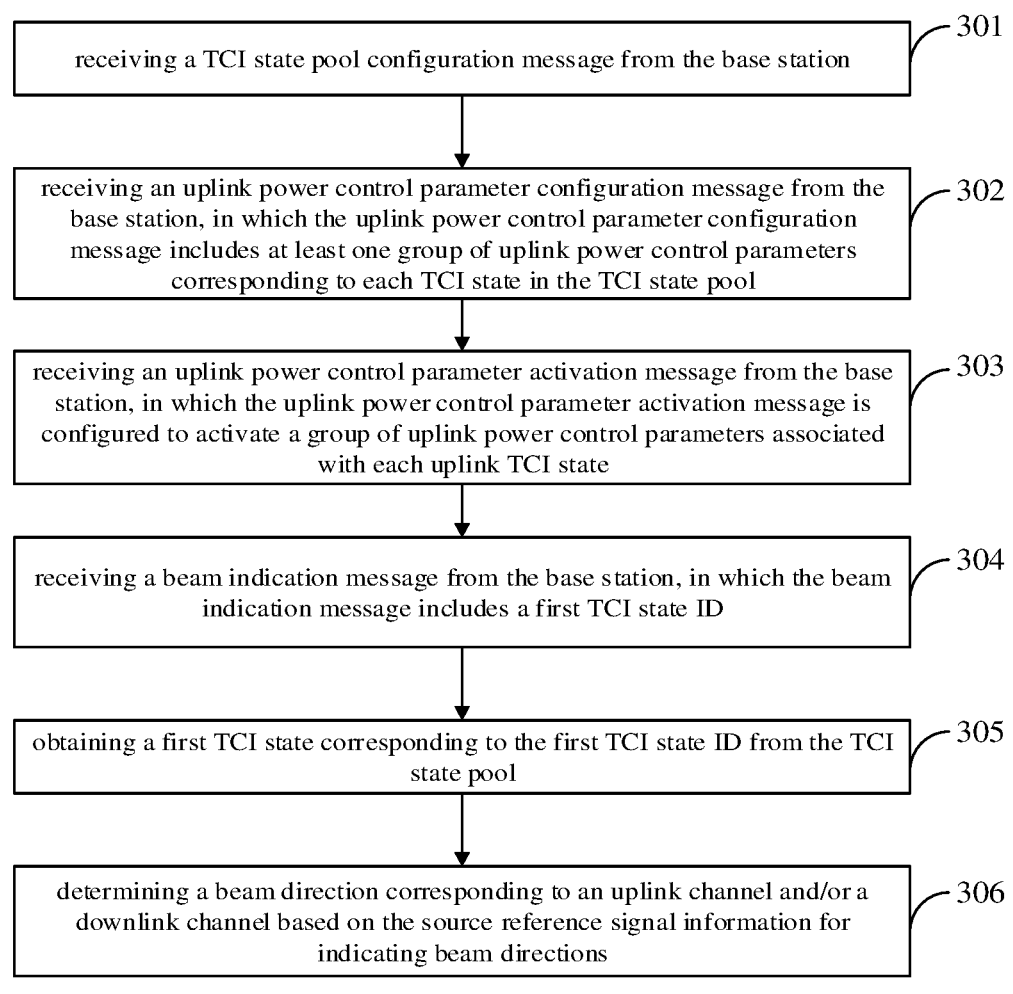

receiving a TCI state pool configuration message from the base station — 301 receiving an uplink power control parameter configuration message from the base station, in which the uplink power control parameter configuration message includes at least one group of uplink power control parameters corresponding to each TCI state in the TCI state pool — 302 receiving an uplink power control parameter activation message from the base station, in which the uplink power control parameter activation message is configured to activate a group of uplink power control parameters associated with each uplink TCI state — 303 receiving a beam indication message from the base station, in which the beam indication message includes a first TCI state ID — 304 obtaining a first TCI state corresponding to the first TCI state ID from the TCI state pool — 305 determining a beam direction corresponding to an uplink channel and/or a downlink channel based on the source reference signal information for indicating beam directions — 306

FIG. 3

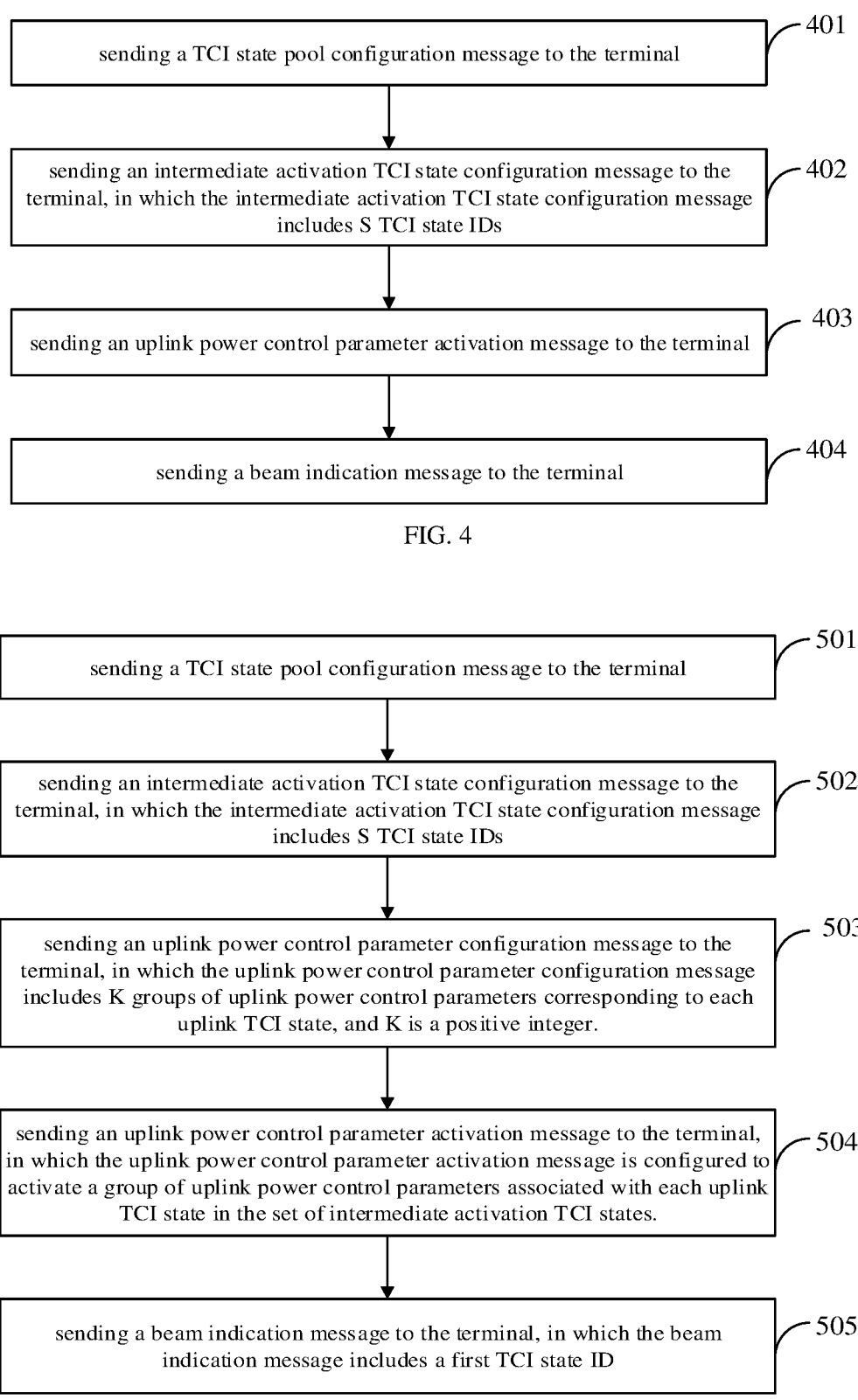

sending a TCI state pool configuration message to the terminal 401 sending an intermediate activation TCI state configuration message to the terminal, in which the intermediate activation TCI state configuration message includes S TCI state IDs 402 sending an uplink power control parameter activation message to the terminal 403 sending a beam indication message to the terminal 404

FIG. 4 sending a TCI state pool configuration message to the terminal 501 sending an intermediate activation TCI state configuration message to the terminal, in which the intermediate activation TCI state configuration message includes S TCI state IDs 502 sending an uplink power control parameter configuration message to the terminal, in which the uplink power control parameter configuration message includes K groups of uplink power control parameters corresponding to each uplink TCI state, and K is a positive integer. 503 sending an uplink power control parameter activation message to the terminal, in which the uplink power control parameter activation message is configured to activate a group of uplink power control parameters associated with each uplink TCI state in the set of intermediate activation TCI states. 504 sending a beam indication message to the terminal, in which the beam indication message includes a first TCI state ID 505

FIG. 5

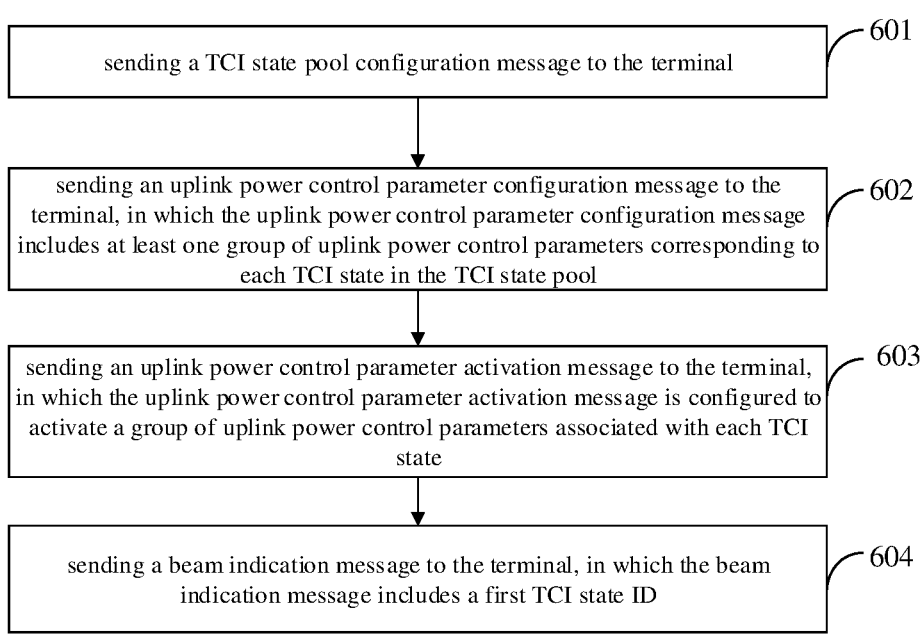

sending a TCI state pool configuration message to the terminal — 601 sending an uplink power control parameter configuration message to the terminal, in which the uplink power control parameter configuration message includes at least one group of uplink power control parameters corresponding to each TCI state in the TCI state pool — 602 sending an uplink power control parameter activation message to the terminal, in which the uplink power control parameter activation message is configured to activate a group of uplink power control parameters associated with each TCI state — 603 sending a beam indication message to the terminal, in which the beam indication message includes a first TCI state ID — 604

FIG. 6

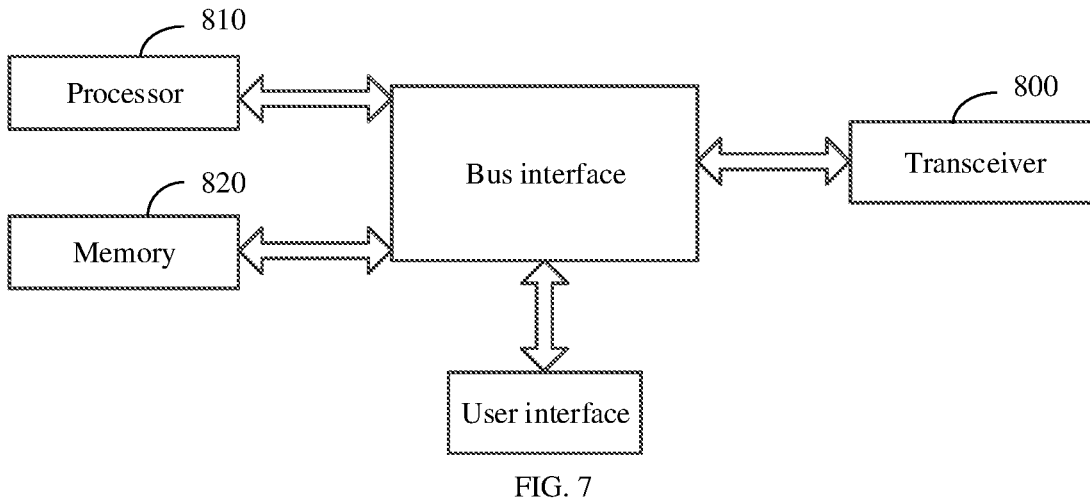

FIG. 7

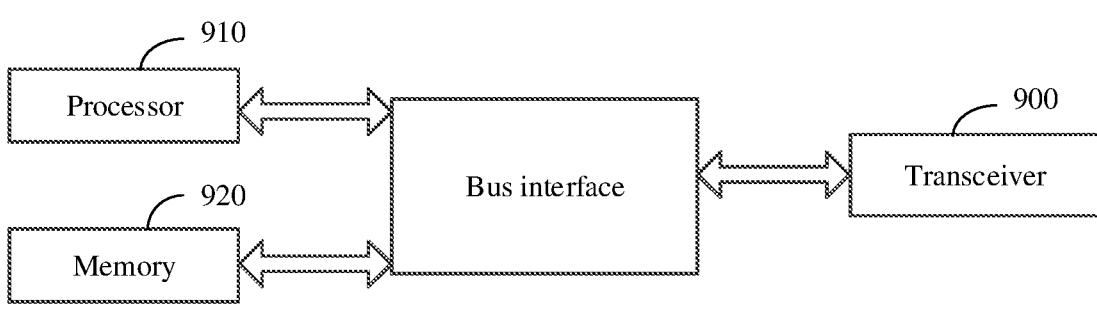

FIG. 8

1000 beam indication apparatus receiving unit ⌐1010 obtaining unit ⌐1020 first determining unit ⌐1030

1100 beam indication apparatus second determining unit ⌐1110 sending unit ⌐1120

BEAM INDICATION METHOD, TERMINAL, NETWORK-SIDE DEVICE, AND STORAGE MEDIUM

CROSS REFERENCE TO RELATED APPLICATION

This application is a national phase of International Application No. PCT/CN2021/125092, filed on Oct. 20, 2021, which claims a priority to Chinese patent application Serial No. 202011149721.0 filed on Oct. 23, 2020, the entire contents of each of which are incorporated herein by reference.

TECHNICAL FIELD

The disclosure relates to the field of communication technologies, in particular to a beam indication method, a terminal, a network-side device, and a storage medium.

BACKGROUND

For the high-frequency transmission, due to the limited transmission range, the uplink channel and/or the downlink channel after beamforming may be used for transmitting data to enhance the coverage. The direction of beamforming is determined by beam scanning on the uplink and/or downlink reference signal (RS).

SUMMARY

According to a first aspect of the disclosure, a beam indication method is provided. The method includes: receiving a beam indication message from a base station, in which the beam indication message includes a first transmission configuration indication (TCI) state ID; obtaining a first TCI state corresponding to the first TCI state ID from a TCI state pool, in which an information field of the first TCI state at most includes two groups of source RS information for indicating beam directions; and determining a beam direction corresponding to an uplink channel and/or a downlink channel based on the source RS information for indicating beam directions.

According to a second aspect of the disclosure, a beam indication method is provided. The method includes: determining a first TCI state, in which an information field of the first TCI state at most includes two groups of source RS information for indicating beam directions; and sending a beam indication message to a terminal, in which the beam indication message includes a first TCI state ID.

According to a third aspect of the disclosure, a terminal is provided. The terminal includes: a memory, a transceiver, and a processor. The memory is configured to store computer programs. The transceiver is configured to send and receive data under a control of the processor. The processor is configured to read the computer programs stored in the memory to perform the following operations: receiving a beam indication message from a base station, in which the beam indication message includes a first TCI state ID; obtaining a first TCI state corresponding to the first TCI state ID from a TCI state pool, in which an information field of the first TCI state at most includes two groups of source RS information for indicating beam directions; and determining a beam direction corresponding to an uplink channel and/or a downlink channel based on the source RS information for indicating beam directions.

According to a fourth aspect of the disclosure, a network-side device is provided. The network-side device includes: a memory, a transceiver, and a processor. The memory is configured to store computer programs. The transceiver is configured to send and receive data under a control of the processor. The processor is configured to read the computer programs stored in the memory to perform the following operations: determining a first TCI state, in which an information field of the first TCI state at most includes two groups of source RS information for indicating beam directions; and sending a beam indication message to a terminal, in which the beam indication message includes a first TCI state ID.

According to a fifth aspect of the disclosure, a processor-readable storage medium having computer programs stored thereon is provided. The computer programs are configured to cause a processor to implement the method of the first aspect of the disclosure.

According to a sixth aspect of the disclosure, a processor-readable storage medium having computer programs stored thereon is provided. The computer programs are configured to cause a processor to implement the method of the second aspect of the disclosure.

Other effects of the above optional approaches will be described below in combination with specific embodiments.

BRIEF DESCRIPTION OF THE DRAWINGS

The accompanying drawings are used to better understand solutions and do not constitute a limitation to the disclosure, in which:

FIG. 1 is a flowchart of a beam indication method according to embodiments of the disclosure.

FIG. 3 is a flowchart of a beam indication method according to embodiments of the disclosure.

FIG. 4 is a flowchart of a beam indication method according to embodiments of the disclosure.

FIG. 5 is a flowchart of a beam indication method according to embodiments of the disclosure.

FIG. 6 is a flowchart of a beam indication method according to embodiments of the disclosure.

FIG. 7 is a schematic diagram of a terminal according to embodiments of the disclosure.

FIG. 8 is a schematic diagram of a network-side device according to embodiments of the disclosure.

DETAILED DESCRIPTION

Figure 2:
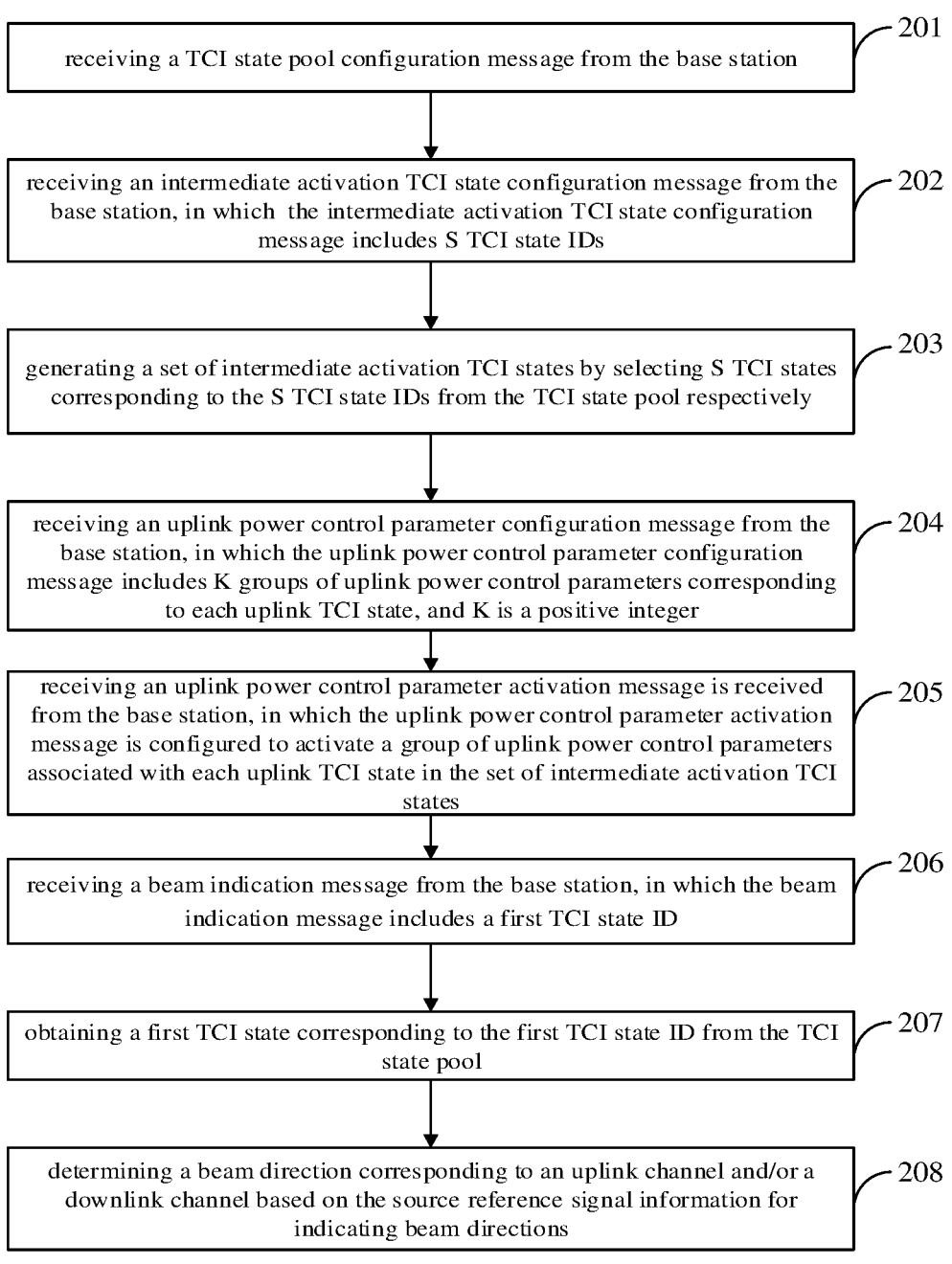
FIG. 2 is a flowchart of a beam indication method according to embodiments of the disclosure.

The following describes embodiments of the disclosure with reference to the accompanying drawings, which includes various details of the embodiments of the disclosure to facilitate understanding and shall be considered merely exemplary. Therefore, those skilled in the art should recognize that various changes and modifications can be made to the embodiments described herein without departing from the scope and spirit of the disclosure. For clarity and conciseness, descriptions of well-known functions and structures are omitted in the following description.

A beam indication method, a terminal, a network-side device, an apparatus, and a storage medium of embodiments of the disclosure are described below with reference to the accompanying drawings.

In the related art, different channels use different beam indication signalings and each channel performs beam indication independently. In the new radio (NR) system, the downlink channel includes a downlink data channel and a downlink control channel, and the uplink channel includes an uplink data channel and an uplink control channel. If each channel uses an independent indication manner to indicate the beam mode, the beam indication signaling needs to be sent for four times, which is complicated and has large signaling overheads.

On the basis, embodiments of the disclosure provide a beam indication method. A beam indication message is received from a base station, in which the beam indication message includes a first TCI state ID. A first TCI state corresponding to the first TCI state ID is obtained from a TCI state pool. An information field of the first TCI state at most includes two groups of source RS information for indicating beam directions. A beam direction corresponding to an uplink channel and/or a downlink channel is determined based on the source RS information for indicating beam directions. Therefore, the uplink channel common beam, the downlink channel common beam, or the same or different common beams of uplink and downlink channels may be indicated by the source RS information for indicating beam directions in one TCI state of the TCI state pool, thereby simplifying the complexity of beam indication and reducing the signaling indication overheads.

FIG. 1 is a flowchart of a beam indication method according to embodiments of the disclosure.

The beam indication method according to embodiments of the disclosure can be performed by the terminal, to determine the beam direction corresponding to the uplink channel and/or the downlink channel based on the source RS information in the received beam indication message sent by the base station.

As shown in FIG. 1, the beam indication method includes the following steps.

At step 101, a TCI state pool configuration message is received from the base station.

In embodiments, the TCI state pool configuration message is used to configure a TCI state pool for the terminal. The TCI state pool configuration message may include information on TCI states to be configured, for example, an ID of each TCI state and an information field of each TCI state.

The terminal obtains the TCI state pool according to the received TCI state pool configuration message sent by the base station. The TCI state pool includes T TCI states and T is a positive integer. The information field of each TCI state may at most include two groups of source RS information for indicating beam directions.

In addition, the source RS information for indicating beam directions in the information field of each TCI state may be the same, i.e., the corresponding beam direction may be the same.

In embodiments, the information field of each TCI state of the TCI state pool configuration message may include K groups of uplink power control parameters corresponding to each uplink TCI state and K is a positive integer. That is, the information field of each TCI state configured by the base station for the terminal may include K groups of uplink power control parameters.

It is noted that when there is no group of uplink power control parameters configured in the information field of each TCI state, it may be achieved by the following modes.

For example, the above TCI state pool configuration message includes at least one group of uplink power control parameters corresponding to each TCI state. Alternatively, the base station sends an uplink power control parameter configuration message to the terminal, in which the uplink power control parameter configuration message includes at least one group of uplink power control parameters. Alternatively, the base station may also configure corresponding uplink power control parameters for each uplink TCI state respectively. That is, the uplink power control parameter configuration message includes at least one group of uplink power control parameters corresponding to each TCI state in the TCI state pool.

In the specific implementation, the base station can configure the group of uplink power control parameters through a radio resource control (RRC) signaling or a downlink control information (DCI) signaling.

At step 102, an intermediate activation TCI state configuration message is received from the base station, in which the intermediate activation TCI state configuration message includes S TCI state IDs.

In embodiments, when the TCI state pool includes a large number of TCI states, the base station may also send the intermediate activation TCI state configuration message to the terminal at certain intervals, to enable the terminal to use only the TCI states in the set of intermediate activation TCI states for transmitting data and signalings within a certain period of time.

The intermediate activation TCI state configuration message may include S TCI state IDs. The intermediate activation TCI state configuration message is configured to configure intermediate activation TCI states. The S TCI state IDs may be TCI state IDs corresponding to TCI states where the frequency of use of the base station is greater than a preset threshold during the current period of time.

After receiving the intermediate activation TCI state configuration message from the base station, the terminal may extract S TCI state IDs from the intermediate activation TCI state configuration message and S is a positive integer less than or equal to T.

For example, the TCI state pool includes 100 TCI states and the intermediate activation TCI state configuration message includes 20 TCI state IDs.

At step 103, a set of intermediate activation TCI states is generated by selecting S TCI states corresponding to the S TCI state IDs from the TCI state pool respectively.

After obtaining the S TCI state IDs in the intermediate activation TCI state configuration message, the terminal selects the S TCI states corresponding to the S TCI state IDs from the TCI state pool respectively, and generates the set of intermediate activation TCI states based on the S TCI states.

The set of intermediate activation TCI states includes the S TCI states, and the S TCI states are in the active state.

At step 104, an uplink power control parameter activation message is received from the base station.

In embodiments, the information field of each TCI state in the TCI state pool includes each uplink TCI state. That is, the terminal has configured an associated relation between each TCI state in the set of intermediate activation TCI states and the group of uplink power control parameters. Therefore, the base station sends the uplink power control parameter activation message to the terminal, and the terminal activates the uplink power control parameters corresponding to each TCI state in the set of intermediate activation TCI states one by one based on the received activation message.

At step 105, a beam indication message is received from the base station, in which the beam indication message includes a first TCI state ID.

In embodiments, the base station may send the beam indication message to the terminal, and the terminal may receive the beam indication message from the base station. The beam indication message is configured to indicate the beam direction of the channel, and the beam indication message may include a TCI state ID, which is referred to herein as the first TCI state ID for ease of description.

After receiving the beam indication message, the terminal may extract the first TCI state ID from the beam indication message.

At step 106, a first TCI state corresponding to the first TCI state ID is obtained from the TCI state pool, in which an information field of the first TCI state at most includes two groups of source RS information for indicating beam directions.

In embodiments, the terminal is pre-configured with the TCI state pool, and the TCI state pool includes at least one TCI state. After obtaining the first TCI state ID, the terminal may obtain the first TCI state from the TCI state pool based on the first TCI state ID. The information field of the first TCI state may include the first TCI state ID, and at most two groups of source RS information for indicating beam directions. The source RS information may be beam direction information of source RS.

In embodiments, the information field contained in each TCI state of the TCI state pool may be the same or different.

At step 107, a beam direction corresponding to an uplink channel and/or a downlink channel is determined based on the source RS information for indicating beam directions.

In embodiments, the beam direction corresponding to the uplink channel and/or the downlink channel may be determined based on the beam direction of the source RS for indicating beam directions. Alternatively, the beam direction of the source RS may be determined as the beam direction corresponding to the uplink channel and/or the downlink channel.

For example, the beam direction of the source RS may be determined as the beam direction corresponding to the uplink data channel and the uplink control channel. Alternatively, the beam direction of the source RS may be determined as the beam direction corresponding to the downlink data channel and the downlink control channel. Alternatively, the beam direction of the source RS can be determined as the beam direction corresponding to the uplink data channel, the uplink control channel, the downlink data channel, and the downlink control channel.

Since there are multiple channels, the channel indicated by the first TCI state is determined firstly when performing beam indication. In embodiments, the information field of the first TCI state may include at least one QCL field. The target channel indicated by the first TCI state may be determined based on the state of each QCL field. The state of the QCL field indicates whether the QCL field is contained in the information field.

In detail, the base station and the terminal may pre-set a correspondence between each QCL field in the information field of the TCI state and the channel. The terminal may, after obtaining the first TCI state, determine the QCL field contained in the information field of the first TCI state, and then the channel corresponding to the contained QCL field is the target channel.

After determining the target channel indicated by the first TCI state, the beam direction corresponding to the target channel may be determined based on the source RS information for indicating beam directions. In detail, the beam direction of the target channel may be determined based on the beam direction of the source RS for indicating beam directions. Alternatively, the beam direction of the source RS may be determined as the beam direction corresponding to the target channel.

For example, if the target channel is the uplink data channel and the uplink control channel, the beam direction of the source RS may be determined as the beam direction corresponding to the uplink data channel and the uplink control channel. Alternatively, if the target channel is the downlink data channel and the downlink control channel, the beam direction of the source RS may be determined as the beam direction corresponding to the downlink data channel and the downlink control channel. Alternatively, if the target channel is the uplink data channel, the uplink control channel, the downlink data channel, and the downlink control channel, the beam direction of the source RS can be determined as the beam direction corresponding to the uplink data channel, the uplink control channel, the downlink data channel and the downlink control channel.

In embodiments, the information field of the first TCI state may also include M QCL fields and N IDs for indicating types of channels to which the M QCL fields belong. The channel types to which the M QCL fields belong may be determined based on the N IDs in the information field, and the target channel indicated by the first TCI state may be determined based on the channel types to which the M QCL field belong.

For example, if the channel type to which the M QCL fields belong is the uplink channel, the target channel indicated by the first TCI state is the uplink channel. If the channel type to which the M QCL fields belong is the downlink channel, the target channel indicated by the first TCI state is the downlink channel. If the channel types to which the M QCL fields belong are the uplink channel and the downlink channel, the target channel indicated by the first TCI state is the uplink channel and the downlink channel.

Since each QCL field in the information field may have corresponding source RS information, the beam direction corresponding to the channel type to which each QCL field belongs is determined based on the source RS information for indicating beam directions corresponding to each QCL field.

The beam indication method of embodiments is further described below in terms of specific embodiments.

The base station configures the TCI state pool for the terminal and the TCI state pool includes L TCI states. The information field contained in each of the L TCI states can be the same or different. Each TCI state at most includes 2 source RSs for indicating beam directions. For example, the TCI state i includes the following information field.

TABLE 1

| Configuration of TCI state i TCI-state-ID | | |
|---|---|---|
| QCL-1 | QCL-2 (UL) | QCL-3 (DL) |
| CC | CC | CC |
| BWP | BWP | BWP |
| Source RS | Source RS | Source RS |
| Type A/B/C | Type D | Type D |
| | Uplink power control parameters | |

In the information field of the TCI state shown in Table 1, TCI-state-ID indicates the TCI state ID, CC indicates the carrier where the source RS is located, bandwidth part (BWP) is a part of the broadband, which indicates the BWP of the carrier where the source RS is located, and Type A/B/C/D indicates the type of QCL field. QCL-1 is used to indicate the time field and frequency field QCL information of the downlink channel in addition to the beam direction information. QCL-2 is used to indicate the uplink common beam and also the uplink power control parameters corresponding to the common beam. QCL-3 is used to indicate the downlink common beam. The source RS of the uplink common beam and the source RS of the downlink common beam can be the same, which indicates the use of the same common beam for the uplink channel and the downlink channel. The source RS of the uplink common beam and the source RS of the downlink common beam can be different, which indicates the use of respective common beams for the uplink channel and the downlink channel.

The uplink power control parameters are uplink power control parameters, which include Pathloss RS, (alpha, P0) used to calculate the uplink channel sending power, and Close loop index used to calculate the uplink channel sending power.

Based on this TCI state i, the terminal sends uplink channel data using the same beam direction as the uplink source RS, receives downlink channel data using a receiving beam direction corresponding to the downlink source RS, and demodulates the downlink channel based on time-frequency information measured by the source RS indicated in QCL-1.

Another TCI state j includes the following information field.

TABLE 2

| Configuration of TCI state j<br>TCI-state-ID |
| --- |
| QCL-2 (UL)<br>CC<br>BWP<br>Source RS<br>Type D<br>Uplink power control parameters |

The TCI state j shown in Table 2 is used only to indicate that the uplink channel uses the same common beam and that the uplink power control parameters are used for uplink channel transmission.

Another TCI state k includes the following information field.

TABLE 3

| Configuration of TCI state k<br>TCI-state-ID | |
| --- | --- |
| QCL-1 | QCL-3 (DL) |
| CC | CC |
| BWP | BWP |
| Source RS | Source RS |
| Type A/B/C | Type D |

The TCI state shown in Table 3 are only used to indicate that the downlink channel uses the same common beam and uses time-frequency information determined by the source RS in QCL-1 for data demodulation.

The base station can send a medium access control control element (MAC-CE) signaling to the terminal, and the terminal selects S states from all TCI states as the intermediate activation TCI states according to the MAC-CE signaling, to generate the set of intermediate activation TCI states. The set of intermediate activation TCI states includes S TCI states, and the S TCI states include W uplink TCI states, and the information fields of the W uplink TCI states include the uplink power control parameters.

According to the beam indication method of embodiments of the disclosure, the TCI state pool is configured for the terminal, and the information field of each TCI state in the TCI state pool at most includes two groups of source RS information for indicating beam directions. During beam indication, the TCI state ID to be used can be sent directly to the terminal, after which the terminal can determine the beam direction of the channel based on the TCI state ID, which simplifies the complexity of beam indication and reduces the signaling overheads.

FIG. 2 is a flowchart of a beam indication method according to embodiments of the disclosure. As shown in FIG. 2, the beam indication method includes the following steps.

At step 201, a TCI state pool configuration message is received from the base station.

In embodiments, the TCI state pool configuration message is used to configure a TCI state pool for the terminal. The TCI state pool configuration message may include information on TCI states to be configured, for example, an ID of each TCI state and an information field of each TCI state.

The terminal obtains the TCI state pool according to the received TCI state pool configuration message sent by the base station. The TCI state pool includes T TCI states and T is a positive integer. The information field of each TCI state may at most include two groups of source RS information for indicating beam directions.

In addition, the source RS information for indicating beam directions in the information field of each TCI state can be the same, that is, the corresponding beam direction can be the same.

At step 202, an intermediate activation TCI state configuration message is received from the base station, in which the intermediate activation TCI state configuration message includes S TCI state IDs.

In embodiments, when the TCI state pool includes a large number of TCI states, the base station can send the intermediate activation TCI state configuration message to the terminal.

The intermediate activation TCI state configuration message may include S TCI state IDs, and the intermediate activation TCI state configuration message is used to configure intermediate activation TCI states. The S TCI state IDs may be TCI state IDs corresponding to TCI states where the frequency of use of the base station is greater than a preset threshold during the current period of time.

After receiving the intermediate activation TCI state configuration message from the base station, the terminal may extract S TCI state IDs from the intermediate activation TCI state configuration message and S is a positive integer less than or equal to T.

For example, the TCI state pool includes 100 TCI states and the intermediate activation TCI state configuration message includes 20 TCI state IDs.

At step 203, a set of intermediate activation TCI states is generated by selecting S TCI states corresponding to the S TCI state IDs from the TCI state pool respectively.

After obtaining the S TCI state IDs in the intermediate activation TCI state configuration message, the terminal selects the S TCI states corresponding to the S TCI state IDs from the TCI state pool respectively, and generates the set of intermediate activation TCI states based on the S TCI states.

The set of intermediate activation TCI states includes the S TCI states, and the S TCI states are in the active state.

At step 204, an uplink power control parameter configuration message is received from the base station, in which the uplink power control parameter configuration message includes K groups of uplink power control parameters corresponding to each uplink TCI state and K is a positive integer.

The uplink power control parameters are uplink power control parameters, which include Pathloss RS, (alpha, P0) used to calculate the uplink channel sending power, and Close loop index used to calculate the uplink channel sending power.

In detail, after receiving the uplink power control parameter configuration message sent by the base station, the terminal associates each TCI state in the TCI state pool with at least one group of uplink power control parameters according to preset rules.

For example, if the uplink power control parameter configuration message includes 3 groups of uplink power control parameters, the terminal can make each TCI state correspond to 3 groups of uplink power control parameters.

It should be noted that the uplink power control parameters can be configured in the following ways, in addition to being implemented as described above.

For example, the information field of each TCI state of the TCI state pool configuration message described above also includes K groups of uplink power control parameters corresponding to each uplink TCI state, and K is a positive integer.

Alternatively, the base station can also configure the corresponding uplink power control parameters for each uplink TCI state, respectively. That is, the uplink power control parameter configuration message includes at least one group of uplink power control parameters corresponding to each TCI state of the TCI state pool.

That is, in practice, each TCI state may correspond to one group of uplink power control parameters, or may correspond to multiple groups of uplink power control parameters, which is not limited in embodiments.

At step 205, an uplink power control parameter activation message is received from the base station, in which the uplink power control parameter activation message is configured to activate a group of uplink power control parameters associated with each uplink TCI state in the set of intermediate activation TCI states.

After obtaining the uplink power control parameter activation message sent by the base station, the terminal can activate a group of uplink power control parameters associated with each uplink TCI state in the set of intermediate activation TCI states.

At step 206, a beam indication message is received from the base station, in which the beam indication message includes a first TCI state ID.

In embodiments, the base station may send the beam indication message to the terminal, and the terminal may receive the beam indication message from the base station. The beam indication message is configured to indicate the beam direction of the channel, and the beam indication message may include a TCI state ID, which is referred to herein as the first TCI state ID for ease of description.

After receiving the beam indication message, the terminal may extract the first TCI state ID from the beam indication message.

At step 207, a first TCI state corresponding to the first TCI state ID is obtained from the TCI state pool.

The information field of the first TCI state at most includes two groups of source RS information for indicating beam directions.

At step 208, a beam direction corresponding to an uplink channel and/or a downlink channel is determined based on the source RS information for indicating beam directions.

In embodiments, the beam direction corresponding to the uplink channel and/or the downlink channel may be determined based on the beam direction of the source RS for indicating beam directions. Alternatively, the beam direction of the source RS may be determined as the beam direction corresponding to the uplink channel and/or the downlink channel.

In embodiments of the disclosure, the information field of the first TCI state may also include at least one QCL field. When determining the beam direction corresponding to the uplink channel and/or the downlink channel based on the source RS information for indicating beam directions as described above, the following approach may be used to determine the target channel whose beam direction needs to be indicated based on the state of the QCL field, and then determine the beam direction corresponding to the target channel based on the RS information.

In embodiments, the target channel indicated by the first TCI state is determined based on the state of each QCL field in the information field. The beam direction corresponding to the target channel is determined based on the source RS information for indicating beam directions.

In detail, since there are multiple channels, the channel indicated by the first TCI state may be determined firstly during the beam indication. In embodiments, the information field of the first TCI state includes at least one QCL field, and the target channel indicated by the first TCI state may be determined based on the state of each QCL field. The state of the QCL field indicates whether the QCL field is contained the information field.

In detail, the base station and the terminal may pre-set a correspondence between each QCL field in the information field of the TCI state and the channel. The terminal may, after obtaining the first TCI state, determine the QCL field contained in the information field of the first TCI state, and thus the channel corresponding to the contained QCL field is the target channel.

After determining the target channel indicated by the first TCI state, the beam direction corresponding to the target channel may be determined based on the source RS information for indicating beam directions. In detail, the beam direction corresponding to the target channel may be determined based on the beam direction of the source RS for indicating beam directions. Alternatively, the beam direction of the source RS is determined as the beam direction corresponding to the target channel.

For example, if the target channel is the uplink data channel and the uplink control channel, the beam direction of the source RS may be determined as the beam direction corresponding to the uplink data channel and the uplink control channel. Alternatively, if the target channel is the downlink data channel and the downlink control channel, the beam direction of the source RS may be determined as the beam direction corresponding to the downlink data channel and the downlink control channel. Alternatively, if the target channel is the uplink data channel, the uplink control channel, the downlink data channel, and the downlink control channel, the beam direction of the source RS can be determined as the beam direction corresponding to the uplink data channel, the uplink control channel, the downlink data channel and the downlink control channel.

In embodiments, the information field of the first TCI state may also include M QCL fields and N IDs for indicating types of channels to which the M QCL fields belong.

The channel types to which the M QCL fields belong may be determined based on the N IDs in the information field, and the target channel indicated by the first TCI state may be determined based on the channel types to which the M QCL fields belong.

For example, if the channel type to which the M QCL fields belong is the uplink channel, the target channel indicated by the first TCI state is the uplink channel. If the channel type to which the M QCL fields belong is the downlink channel, the target channel indicated by the first TCI state is the downlink channel. If the channel types to which the M QCL fields belong are the uplink channel and the downlink channel, the target channel indicated by the first TCI state is the uplink channel and the downlink channel.

Since each QCL field in the information field may have corresponding source RS information, the beam direction corresponding to the channel type to which each QCL field belongs is determined based on the source RS information for indicating beam directions corresponding to each QCL field.

The beam indication method of embodiments is further described below in terms of specific embodiments.

The base station configures L TCI states for indicating uplink transmission for the terminal via a RRC signaling, and the uplink TCI states do not include the uplink power control parameters. The TCI state m can be expressed in the form shown in Table 4.

TABLE 4

| Configuration of TCI state m |
| --- |
| TCI-state-ID |
| CC |
| BWP |
| Source RS |

Meanwhile, the base station configures at least one group of uplink power control parameters for the terminal via a RRC signaling, and each group of uplink power control parameters includes Pathloss RS/(alpha,P0)/Close loop index. PathlossRS is path loss RS, which is used to calculate the path loss of downlink transmission. The (alpha, P0) parameter is used to calculate the uplink sending power. The close loop index is also used to calculate the uplink sending power. For example, the group j of uplink power control parameters is expressed in the form shown in Table 5.

TABLE 5

| Configuration of group j of uplink power control parameters |
| --- |
| PC-ID |
| Pathloss RS |
| (alpha, P0) |
| Close loop index |

The base station selects S states from the total TCI states via a MAC-CE as the intermediate activation TCI states. The S intermediate activation TCI states include W uplink transmission TCI states. Meanwhile, the base station selects W groups of parameters from all uplink power control parameters via a MAC-CE as the intermediate activation uplink power control parameters.

The system may predefine a correspondence between the intermediate activation TCI state and the intermediate activation uplink power control parameters. Alternatively, the base station may configure a correspondence between the intermediate activation TCI state and the intermediate activation uplink power control parameters, and send the correspondence to the terminal. In this way, when the base station indicates an uplink TCI state, the uplink power control parameters corresponding to this TCI state can be obtained based on the correspondence. Afterwards, the terminal can use the beam direction indicated by the TCI state and its associated uplink power control parameters for uplink transmission.

Another approach may be that a number of MAC-CE-activated intermediate uplink power control parameters is different from a number of MAC-CE-activated uplink transmission TCI states. For example, the S intermediate activation TCI states include 51 uplink transmission TCI states, while the base station selects S2 groups of parameters as the intermediate activation uplink power control parameters from all uplink power control parameters via a MAC-CE. Preferentially, S2<S1. Therefore, multiple uplink TCI states may correspond to the same group of uplink power control parameters. For example, if S1=2×52, the system predefines two uplink TCI states corresponding to the same group of uplink power control parameters.

According to the beam indication method of embodiments of the disclosure, the TCI state pool is configured for the terminal, and the information field of each TCI state in the TCI state pool at most includes two groups of source RS information for indicating beam directions. The TCI state ID to be used can be directly sent to the terminal during beam indication, and the terminal can determine the beam direction of the channel based on the TCI state ID, thereby simplifying the complexity of beam indication and reducing the signaling indication overheads.

Another beam indication method provided by this disclosure is described below in combination with FIG. 3. As described in FIG. 3, the beam indication method includes the following steps.

At step 301, a TCI state pool configuration message is received from the base station.

In embodiments, the TCI state pool configuration message is used to configure the TCI state pool for the terminal. The TCI state pool configuration message may include information on TCI states to be configured, such as an ID of each TCI state and an information field of each TCI state.

The terminal obtains the TCI state pool according to the received TCI state pool configuration message sent by the base station. The TCI state pool includes T TCI states and T is a positive integer. The information field of each TCI state may at most include two groups of source RS information for indicating beam directions.

In addition, the source RS information for indicating beam directions in the information field of each TCI state can be the same, that is, the corresponding beam direction can be the same.

At step 302, an uplink power control parameter configuration message is received from the base station, in which the uplink power control parameter configuration message includes at least one group of uplink power control parameters corresponding to each TCI state in the TCI state pool.

The uplink power control parameters are uplink power control parameters, which include Pathloss RS, (alpha, P0) used to calculate the uplink channel sending power, and Close loop index used to calculate the uplink channel sending power.

In detail, the terminal can associate each TCI state in the TCI state pool with at least one group of uplink power control parameters after receiving the uplink power control parameter configuration message sent by the base station.

For example, the uplink power control parameter configuration message includes 3 groups of uplink power control parameters, and the terminal can make each TCI state correspond to 3 groups of uplink power control parameters.

It should be noted that the uplink power control parameters can be configured in the following manner in addition to the above-mentioned manner.

For example, the information field of each TCI state of the TCI state pool configuration message described above further includes K groups of uplink power control parameters corresponding to each uplink TCI state, and K is a positive integer. Alternatively, the TCI state pool configuration message includes at least one group of uplink power control parameters corresponding to each TCI state. Alternatively, the base station may also configure the uplink power control parameters for all uplink TCI states through a single uplink power control parameter configuration process. That is, the above uplink power control parameter configuration message includes at least one group of uplink power control parameters.

In practice, each TCI state may correspond to one group of uplink power control parameters, or may correspond to multiple groups of uplink power control parameters, which is not limited in embodiments.

At step 303, an uplink power control parameter activation message is received from the base station, in which the uplink power control parameter activation message is configured to activate a group of uplink power control parameters associated with each uplink TCI state.

It should be noted that in practice, when the TCI state pool includes a large number of TCI states, the base station may also send the intermediate activation TCI state configuration message to the terminal at certain intervals, to enable the terminal to use only the TCI states in the set of intermediate activation TCI states for transmitting data and signalings within a certain period of time. That is, in embodiments of the disclosure, the method may also include: receiving an intermediate activation TCI state configuration message from the base station, in which the intermediate activation TCI state configuration message includes S TCI state IDs and S is a positive integer less than or equal to T; and generating a set of intermediate activation TCI states by selecting S TCI states corresponding to the S TCI state IDs from the TCI state pool respectively.

In detail, after receiving the intermediate activation TCI state configuration message from the base station, the terminal may extract S TCI state IDs from the intermediate activation TCI state configuration message and S is a positive integer less than or equal to T.

For example, the TCI state pool includes 100 TCI states, and the intermediate activation TCI state configuration message includes 20 TCI state IDs.

Further, after obtaining the S TCI state IDs in the intermediate activation TCI state configuration message, the terminal selects the S TCI states corresponding to the S TCI state IDs from the TCI state pool respectively, and generates the set of intermediate activation TCI states based on the S TCI states.

The set of intermediate activation TCI states includes the S TCI states, and the S TCI states are in the active state.

It is understood that if the base station configures the set of intermediate activation TCI states for the terminal, the uplink power control parameters activated by the base station when the terminal performs the uplink power control parameter activation are the uplink power control parameters associated with each uplink TCI state in the set of intermediate activation TCI states.

At step 304, a beam indication message is received from the base station, in which the beam indication message includes a first TCI state ID.

In embodiments, the base station may send the beam indication message to the terminal, and the terminal may receive the beam indication message from the base station. The beam indication message is configured to indicate the beam direction of the channel, and the beam indication message may include a TCI state ID, which is referred to herein as the first TCI state ID for ease of description.

After receiving the beam indication message, the terminal may extract the first TCI state ID from the beam indication message.

At step 305, a first TCI state corresponding to the first TCI state ID is obtained from the TCI state pool.

The information field of the first TCI state at most includes two groups of source RS information for indicating beam directions.

At step 306, a beam direction corresponding to an uplink channel and/or a downlink channel is determined based on the source RS information for indicating beam directions.

In embodiments, the beam direction corresponding to the uplink channel and/or the downlink channel may be determined based on the beam direction of the source RS for indicating beam directions. Alternatively, the beam direction of the source RS may be determined as the beam direction corresponding to the uplink channel and/or the downlink channel.

In embodiments of the disclosure, the information field of the first TCI state may also include at least one QCL field. When determining the beam direction corresponding to the uplink channel and/or the downlink channel based on the source RS information for indicating beam directions as described above, the following approach may be used to determine the target channel whose beam direction needs to be indicated based on the state of the QCL field, and then determine the beam direction corresponding to the target channel based on the RS information.

In embodiments, the target channel indicated by the first TCI state is determined based on the state of each QCL field in the information field. The beam direction corresponding to the target channel is determined based on the source RS information for indicating beam directions.

In detail, since there are multiple channels, the channel indicated by the first TCI state may be determined firstly during the beam indication. In embodiments, the information field of the first TCI state includes at least one QCL field, and the target channel indicated by the first TCI state may be determined based on the state of each QCL field. The state of the QCL field indicates whether the QCL field is contained the information field.

In detail, the base station and the terminal may pre-set a correspondence between each QCL field in the information field of the TCI state and the channel. The terminal may, after obtaining the first TCI state, determine the QCL field contained in the information field of the first TCI state, and thus the channel corresponding to the contained QCL field is the target channel.

After determining the target channel indicated by the first TCI state, the beam direction corresponding to the target channel may be determined based on the source RS information for indicating beam directions.

In detail, the beam direction of the target channel may be determined based on the beam direction of the source RS for indicating beam directions. Alternatively, the beam direction of the source RS may be determined as the beam direction corresponding to the target channel.

For example, if the target channel is the uplink data channel and the uplink control channel, the beam direction of the source RS may be determined as the beam direction corresponding to the uplink data channel and the uplink control channel. Alternatively, if the target channel is the downlink data channel and the downlink control channel, the beam direction of the source RS may be determined as the beam direction corresponding to the downlink data channel and the downlink control channel. Alternatively, if the target channel is the uplink data channel, the uplink control channel, the downlink data channel, and the downlink control channel, the beam direction of the source RS can be determined as the beam direction corresponding to the uplink data channel, the uplink control channel, the downlink data channel and the downlink control channel.

In embodiments, the information field of the first TCI state may also include M QCL fields and N IDs for indicating types of channels to which the M QCL fields belong. The channel types to which the M QCL fields belong may be determined based on the N IDs in the information field, and the target channel indicated by the first TCI state may be determined based on the channel types to which the M QCL fields belong.

For example, if the channel type to which the M QCL fields belong is the uplink channel, the target channel indicated by the first TCI state is the uplink channel. If the channel type to which the M QCL fields belong is the downlink channel, the target channel indicated by the first TCI state is the downlink channel. If the channel types to which the M QCL fields belong are the uplink channel and the downlink channel, the target channel indicated by the first TCI state is the uplink channel and the downlink channel.

Since each QCL field in the information field may have corresponding source RS information, the beam direction corresponding to the channel type to which each QCL field belongs is determined based on the source RS information for indicating beam directions corresponding to each QCL field.

The beam indication method of embodiments is further described below in terms of specific embodiments.

The base station configures L TCI states for indicating uplink transmission for the terminal via a RRC signaling, and each of the uplink TCI states does not include the uplink power control parameters. The information field of the TCI state n can be expressed in the form shown in Table 6.

TABLE 6

| information field of TCI state n |
|---|
| TCI-state-ID |
| CC |
| BWP |
| Source RS |

Meanwhile, the base station configures 4 groups of uplink power control parameters for each TCI state of the L TCI states of uplink transmission via a RRC signaling. For example, the 4 groups of uplink power control parameters associated with TCI-state-6 are represented as {PC-0, PC-1, PC-2, PC-3}, in which each group of uplink power control parameters is determined by Table 7.

TABLE 7

| Configuration of group of uplink power control parameters PC-ID |
|---|
| Pathloss RS |
| (alpha, P0) |
| Close loop index |

Before the beam indication, the base station can activate the group of uplink power control parameters associated with each TCI state of uplink transmission via a MAC-CE command. For example, a second group of control parameters associated with all uplink TCI states is activated via a MAC-CE signaling. Therefore, when the base station indicates an uplink TCI state to the terminal, it uses the second group of control parameters associated with this state for transmission on the uplink channel.

Alternatively, the base station can use a MAC-CE signaling for each uplink TCI state to activate the corresponding group of control parameters. For example, for uplink TCI state 1, the first group of control parameters associated with uplink TCI state 1 is activated via a MAC-CE signaling. For uplink TCI state 2, the third group of control parameters associated with uplink TCI state 2 is activated via another MAC-CE signaling.

According to the beam indication method of embodiments of the disclosure, the TCI state pool is configured for the terminal, and the information field of each TCI state in the TCI state pool at most includes two groups of source RS information for indicating beam directions. The TCI state ID to be used can be directly sent to the terminal during the beam indication, after which the terminal can determine the beam direction of the channel based on the TCI state ID, which simplifies the complexity of beam indication and reduces the signaling indication overheads.

Another beam indication method provided by embodiments of the disclosure is illustrated below in combination with FIG. 4. FIG. 4 is a flowchart of another beam indication method according to embodiments of the disclosure.

The beam indication method of embodiments can be performed by a network-side device such as a base station. As shown in FIG. 4, the beam indication method includes the following steps.

At step 401, a TCI state pool configuration message is sent to the terminal.

In embodiments, the base station can send the TCI state pool configuration message to the terminal, to configure a TCI state pool for the terminal based on the TCI state pool configuration message. The TCI state pool configuration message includes information on the TCI states to be configured, such as an ID of each TCI state and an information field of each TCI state.

The base station can configure the TCI state pool including T TCI states for the terminal based on the TCI state pool configuration message, T is a positive integer, and the information field of each TCI state at most includes two groups of source RS information for indicating beam directions.

In embodiments, the information field of each TCI state of the TCI state pool configuration message may include K groups of uplink power control parameters corresponding to each uplink TCI state, and K is a positive integer. That is, the information field of each TCI state configured by the base station for the terminal may include a group of uplink power control parameters.

In specific implementation, the base station can configure K groups of uplink power control parameters for each uplink TCI state via a RRC signaling or a DCI signaling.

At step 402, an intermediate activation TCI state configuration message is sent to the terminal, in which the intermediate activation TCI state configuration message includes S TCI state IDs.

In embodiments, when the TCI state pool includes a large number of TCI states, the base station may also send the intermediate activation TCI state configuration message to the terminal at certain intervals, to enable the terminal to use only the TCI states in the set of intermediate activation TCI states for transmitting data and signalings within a certain period of time. The intermediate activation TCI state configuration message may include S TCI state IDs. The intermediate activation TCI state configuration message is configured to configure intermediate activated TCI states. The S TCI state IDs may be TCI state IDs corresponding to TCI states where the frequency of use of the base station is greater than a preset threshold during the current period of time.

Upon receiving the intermediate activation TCI state configuration message from the base station, the terminal may extract the S TCI state IDs from the intermediate activation TCI state configuration message and S is a positive integer less than or equal to T.

For example, the TCI state pool includes 100 TCI states and the intermediate activation TCI state configuration message includes 20 TCI state IDs.

After obtaining the S TCI state IDs in the intermediate activation TCI state configuration message, the terminal selects the S TCI states corresponding to the S TCI state IDs from the TCI state pool respectively and generates the set of intermediate activation TCI states based on the S TCI states.

The set of intermediate activation TCI states includes the S TCI states, and the S TCI states are in the active state.

At step 403, an uplink power control parameter activation message is sent to the terminal.

In embodiments, the information field of each TCI state in the TCI state pool includes each uplink TCI state. That is, the terminal has configured an associated relation between each TCI state in the set of intermediate activation TCI states and the group of uplink power control parameters. Therefore, the base station sends the uplink power control parameter activation message to the terminal, and the terminal activates the group of uplink power control parameters corresponding to each TCI state in the set of intermediate activation state TCI states one by one based on the received uplink power control parameter activation message.

At step 404, a beam indication message is sent to the terminal.

In embodiments, the base station sends the uplink power control parameter activation message to the terminal, and after activating the groups of uplink power control parameters associated with each TCI state in the set of intermediate activation TCI states, it also sends the beam indication message to the terminal.

In detail, the base station may determine the first TCI state from the TCI state pool as needed, and the TCI state pool includes at least one TCI state, and the information field of each TCI state may be the same or different.

Alternatively, the first TCI state may be a TCI state selected randomly, or the first TCI state may be selected based on the number of usage. For example, the TCI state with the highest number of usage is selected as the first TCI state.

The information field of the first TCI state may include the first TCI state ID and at most include two groups of source RS information for indicating beam directions. The source RS information may be the beam direction information of the source RS.

In an implementation, the information field of the first TCI state may include at least one QCL field. When determining the first TCI state, the state of each QCL field in the information field of the first TCI state may also be determined as needed for the indication. The state of the QCL field indicates whether the QCL field is contained in the information field. When the QCL field is contained in the information field of the first TCI state, the channel corresponding to the contained QCL field is the target channel indicated by the first TCI state. The terminal may determine the beam direction of the source RS as the beam direction corresponding to the target channel.

The information field of the first TCI state may also include M QCL fields and N IDs for indicating types of channels to which the M QCL fields belong, M is a positive integer and N is less than or equal to M.

When determining the first TCI state, the number of QCL fields contained in the information field of the first TCI state and the IDs corresponding to the types of channels to which the QCL fields belong may be determined. For example, the information field of the TCI state as shown in Table 1 includes 3 QCL fields and ID UL and DL corresponding to the types of channels to which 2 QCL fields belong.

After determining the first TCI state, the base station may send the beam indication message to the terminal, and the terminal may receive the beam indication message from the base station. The beam indication message is used to indicate the beam direction of the channel, and the beam indication message includes the first TCI state ID.

After receiving the beam indication message, the terminal may extract the first TCI state ID from the beam indication message. The terminal is pre-configured with a TCI state pool, and the TCI state pool includes at least one TCI state. After obtaining the first TCI state ID, the terminal may obtain the first TCI state from the TCI state pool based on the first TCI state ID.

The terminal may determine the beam direction corresponding to the uplink channel and/or the downlink channel based on the beam direction of the source RS for indicating beam directions. Alternatively, the beam direction of the source RS is determined as the beam direction corresponding to the uplink channel and/or the downlink channel.

According to the beam indication method of embodiments of the disclosure, the TCI state pool is configured for the terminal, and the information field of each TCI state in the TCI state pool at most includes two groups of source RS information for indicating beam directions. The TCI state ID to be used can be sent directly to the terminal during beam indication, after which the terminal can determine the beam direction of the channel based on the TCI state ID, which simplifies the complexity of beam indication and reduces the signaling indication overheads.

Another beam indication method provided by embodiments of the disclosure is illustrated below in combination with FIG. 5. FIG. 5 is a flowchart of another beam indication method according to embodiments of the disclosure.

The beam indication method of embodiments can be performed by a network-side device such as a base station. As shown in FIG. 5, the beam indication method includes the following steps.

At step 501, a TCI state pool configuration message is sent to the terminal.

In embodiments, the TCI state pool configuration message is used to configure a TCI state pool for the terminal. The TCI state pool configuration message may include information on TCI states to be configured, such as an ID of each TCI state and an information field of each TCI state.

The terminal obtains the TCI state pool according to the received TCI state pool configuration message sent by the base station. The TCI state pool includes T TCI states and T is a positive integer. The information field of each TCI state may at most include two groups of source RS information for indicating beam directions.

In addition, the source RS information for indicating beam directions in the information field of each TCI state can be the same, that is, the corresponding beam direction can be the same.

At step 502, an intermediate activation TCI state configuration message is sent to the terminal, in which the intermediate activation TCI state configuration message includes S TCI state IDs.

In embodiments, when the TCI state pool includes a large number of TCI states, the base station may send the intermediate activation TCI state configuration message to the terminal.

The intermediate activation TCI state configuration message may include S TCI state IDs. The intermediate activation TCI state configuration message is used to configure intermediate activation TCI states, and the S TCI state IDs may be TCI state IDs corresponding to TCI states where the frequency of use of the base station is greater than a preset threshold during the current period of time.

After receiving the intermediate activation TCI state configuration message from the base station, the terminal may extract the S TCI state IDs from the intermediate activation TCI state configuration message, and S is a positive integer less than or equal to T.

For example, the TCI state pool includes 100 TCI states, and the intermediate activation TCI state configuration message includes 20 TCI state IDs.

Therefore, the terminal, after obtaining the S TCI state IDs in the intermediate activation TCI state configuration message, selects the S TCI states corresponding to the S TCI state IDs from the TCI state pool respectively, and generates the set of intermediate activation TCI states based on the S TCI states.

The set of intermediate activation TCI states includes S TCI states, and the S TCI states are in the active state.

At step 503, an uplink power control parameter configuration message is sent to the terminal, in which the uplink power control parameter configuration message includes K groups of uplink power control parameters corresponding to each uplink TCI state, and K is a positive integer.

The uplink power control parameters are uplink power control parameters, which include Pathloss RS, (alpha, P0) used to calculate the uplink channel sending power, and Close loop index used to calculate the uplink channel sending power.

In detail, after receiving the uplink power control parameter configuration message sent by the base station, the terminal associates each TCI state in the TCI state pool with at least one group of uplink power control parameters.

For example, if the uplink power control parameter configuration message includes 3 groups of uplink power control parameters, the terminal can make each TCI state correspond to 3 groups of uplink power control parameters.

It should be noted that the uplink power control parameters can be configured in the following ways, in addition to being implemented as described above.

For example, the information field of each TCI state of the TCI state pool configuration message described above also includes K groups of uplink power control parameters corresponding to each uplink TCI state, and K is a positive integer. Alternatively, the TCI state pool configuration message includes at least one group of uplink power control parameters corresponding to each TCI state.

Alternatively, the base station can also configure the corresponding uplink power control parameters for each uplink TCI state, respectively. That is, the uplink power control parameter configuration message includes at least one group of uplink power control parameters corresponding to each TCI state of the TCI state pool.

That is, in practice, each TCI state may correspond to one group of uplink power control parameters, or may correspond to multiple groups of uplink power control parameters, which is not limited in embodiments.

At step 504, an uplink power control parameter activation message is sent to the terminal, in which the uplink power control parameter activation message is configured to activate a group of uplink power control parameters associated with each uplink TCI state in the set of intermediate activation TCI states.

At step 505, a beam indication message is sent to the terminal, in which the beam indication message includes a first TCI state ID.

In embodiments, the base station may send the beam indication message to the terminal, and the terminal may receive the beam indication message from the base station. The beam indication message is configured to indicate the beam direction of the channel, and the beam indication message may include a TCI state ID, which is referred to herein as the first TCI state ID for ease of description.

After receiving the beam indication message, the terminal may extract the first TCI state ID from the beam indication message. The beam direction corresponding to the uplink channel and/or the downlink channel is determined based on the source RS information for indicating beam directions.

In embodiments, the beam direction corresponding to the uplink channel and/or the downlink channel can be determined based on the beam direction of the source RS for indicating beam directions. Alternatively, the beam direction of the source RS is determined as the beam direction corresponding to the uplink channel and/or the downlink channel.

In embodiments of the disclosure, the information field of the first TCI state may also include at least one QCL field. When determining the beam direction corresponding to the uplink channel and/or the downlink channel based on the source RS information for indicating beam directions as described above, the following approach may be used to determine the target channel whose beam direction needs to be indicated based on the state of the QCL field, and then determine the beam direction corresponding to the target channel based on the RS information.

In embodiments, the target channel indicated by the first TCI state is determined based on the state of each QCL field in the information field. The beam direction corresponding to the target channel is determined based on the source RS information for indicating beam directions.

In detail, since there are multiple channels, the channel indicated by the first TCI state may be determined firstly during the beam indication. In embodiments, the information field of the first TCI state includes at least one QCL field, and the target channel indicated by the first TCI state may be determined based on the state of each QCL field. The state of the QCL field indicates whether the QCL field is contained the information field.

In detail, the base station and the terminal may pre-set a correspondence between each QCL field in the information field of the TCI state and the channel. The terminal may, after obtaining the first TCI state, determine the QCL field contained in the information field of the first TCI state, and thus the channel corresponding to the contained QCL field is the target channel.

After determining the target channel indicated by the first TCI state, the beam direction corresponding to the target channel may be determined based on the source RS information for indicating beam directions.

In detail, the beam direction of the target channel may be determined based on the beam direction of the source RS for indicating beam directions. Alternatively, the beam direction of the source RS may be determined as the beam direction corresponding to the target channel.

For example, if the target channel is the uplink data channel and the uplink control channel, the beam direction of the source RS may be determined as the beam direction corresponding to the uplink data channel and the uplink control channel. Alternatively, if the target channel is the downlink data channel and the downlink control channel, the beam direction of the source RS may be determined as the beam direction corresponding to the downlink data channel and the downlink control channel. Alternatively, if the target channel is the uplink data channel, the uplink control channel, the downlink data channel, and the downlink control channel, the beam direction of the source RS can be determined as the beam direction corresponding to the uplink data channel, the uplink control channel, the downlink data channel and the downlink control channel.

In embodiments, the information field of the first TCI state may also include M QCL fields and N IDs for indicating types of channels to which the M QCL fields belong. The channel types to which the M QCL fields belong may be determined based on the N IDs in the information field, and the target channel indicated by the first TCI state may be determined based on the channel types to which the M QCL fields belong.

For example, if the channel type to which the M QCL fields belong is the uplink channel, the target channel indicated by the first TCI state is the uplink channel. If the channel type to which the M QCL fields belong is the downlink channel, the target channel indicated by the first TCI state is the downlink channel. If the channel types to which the M QCL fields belong are the uplink channel and the downlink channel, the target channel indicated by the first TCI state is the uplink channel and the downlink channel.

Since each QCL field in the information field may have corresponding source RS information, the beam direction corresponding to the channel type to which each QCL field belongs is determined based on the source RS information for indicating beam directions corresponding to each QCL field.

According to the beam indication method of embodiments of the disclosure, the TCI state pool is configured for the terminal, and the information field of each TCI state in the TCI state pool at most includes two groups of source RS information for indicating beam directions. During beam indication, the TCI state ID to be used can be sent directly to the terminal, after which the terminal can determine the beam direction of the channel based on the TCI state ID, which simplifies the complexity of beam indication and reduces the signaling indication overheads.

Another beam indication method provided by embodiment of the disclosure is illustrated below in combination with FIG. 6. FIG. 6 is a flowchart of another beam indication method according to embodiments of the disclosure.

The beam indication method of embodiments can be performed by a network-side device such as a base station. As shown in FIG. 6, the beam indication method includes the following steps.

At step 601, a TCI state pool configuration message is sent to the terminal.

In embodiments, the TCI state pool configuration message is used to configure a TCI state pool for the terminal. The TCI state pool configuration message may include information on TCI states to be configured, such as an ID of each TCI state and an information field of each TCI state.

The terminal obtains the TCI state pool according to the received TCI state pool configuration message sent by the base station. The TCI state pool includes T TCI states and T is a positive integer. The information field of each TCI state may at most include two groups of source RS information for indicating beam directions.

In addition, the source RS information for indicating beam directions in the information field of each TCI state can be the same, that is, the corresponding beam direction can be the same.

At step 602, an uplink power control parameter configuration message is sent to the terminal, in which the uplink power control parameter configuration message includes at least one group of uplink power control parameters corresponding to each TCI state in the TCI state pool.

The uplink power control parameters are uplink power control parameters, which include Pathloss RS, (alpha, P0) used to calculate the uplink channel sending power, and Close loop index used to calculate the uplink channel sending power.

In detail, after receiving the uplink power control parameter configuration message sent by the base station, the terminal associates each TCI state in the TCI state pool with at least one group of uplink power control parameters.

For example, if the uplink power control parameter configuration message includes 3 groups of uplink power control parameters, the terminal can make each TCI state correspond to 3 groups of uplink power control parameters.

It should be noted that the uplink power control parameters can be configured in the following ways, in addition to being implemented as described above.

For example, the information field of each TCI state of the TCI state pool configuration message described above also includes K groups of uplink power control parameters corresponding to each uplink TCI state, and K is a positive integer. Alternatively, the TCI state pool configuration message includes at least one group of uplink power control parameters corresponding to each TCI state.

Alternatively, the base station may also configure the uplink power control parameters for all uplink TCI states through a single uplink power control parameter configuration process. That is, the above uplink power control parameter configuration message includes at least one group of uplink power control parameters.

In practice, each TCI state may correspond to one group of uplink power control parameters, or may correspond to multiple groups of uplink power control parameters, which is not limited in embodiments.

At step 603, an uplink power control parameter activation message is sent to the terminal, in which the uplink power control parameter activation message is configured to activate a group of uplink power control parameters associated with each TCI state.

In embodiments, in practice, when the TCI state pool includes a large number of TCI states, the base station may also send the intermediate activation TCI state configuration message to the terminal at certain intervals, to enable the terminal to use only the TCI states in the set of intermediate activation TCI states for transmitting data and signalings within a certain period of time. In embodiments of the disclosure, the method may also include: sending an intermediate activation TCI state configuration message to the terminal, in which the intermediate activation TCI state configuration message includes S TCI state IDs, and S is a positive integer less than or equal to T.

In detail, after receiving the intermediate activation TCI state configuration message from the base station, the terminal may extract the S TCI state IDs from the intermediate activation TCI state configuration message, and S is a positive integer less than or equal to T.

For example, the TCI state pool includes 100 TCI states, and the intermediate activation TCI state configuration message includes 20 TCI state IDs.

After obtaining the S TCI state IDs in the intermediate activation TCI state configuration message, the terminal selects the S TCI states corresponding to the S TCI state IDs from the TCI state pool respectively, and generates the set of intermediate activation TCI states based on the S TCI states.

The set of intermediate activation TCI states includes the S TCI states, and the S TCI states are in the active state.

It is understood that if the base station configures the set of intermediate activation TCI states for the terminal, the uplink power control parameters activated by the base station when the terminal performs the uplink power control parameter activation are the uplink power control parameters associated with each uplink TCI state in the set of intermediate activation TCI states.

At step 604, a beam indication message is sent to the terminal, in which the beam indication message includes a first TCI state ID.

In embodiments, the base station may send the beam indication message to the terminal, and the terminal may receive the beam indication message from the base station. The beam indication message is configured to indicate the beam direction of the channel, and the beam indication message may include a TCI state ID, which is referred to herein as the first TCI state ID for ease of description.

After receiving the beam indication message, the terminal may extract the first TCI state ID from the beam indication message. The beam direction corresponding to the uplink channel and/or the downlink channel is determined based on the source RS information for indicating beam directions.

In embodiments, the beam direction corresponding to the uplink channel and/or the downlink channel can be determined based on the beam direction of the source RS for indicating beam directions. Alternatively, the beam direction of the source RS is determined as the beam direction corresponding to the uplink channel and/or the downlink channel.

In embodiments of the disclosure, the information field of the first TCI state may also include at least one QCL field. When determining the beam direction corresponding to the uplink channel and/or the downlink channel based on the source RS information for indicating beam directions as described above, the following approach may be used to determine the target channel whose beam direction needs to be indicated based on the state of the QCL field, and then determine the beam direction corresponding to the target channel based on the RS information.

The target channel indicated by the first TCI state is determined based on the state of each QCL field in the information field.

The beam direction corresponding to the target channel is determined based on the source RS information for indicating beam directions.

In detail, since there are multiple channels, the channel indicated by the first TCI state may be determined firstly during the beam indication. In embodiments, the information field of the first TCI state includes at least one QCL field, and the target channel indicated by the first TCI state may be determined based on the state of each QCL field. The state of the QCL field indicates whether the QCL field is contained the information field.

In detail, the base station and the terminal may pre-set a correspondence between each QCL field in the information field of the TCI state and the channel. The terminal may, after obtaining the first TCI state, determine the QCL field contained in the information field of the first TCI state, and thus the channel corresponding to the contained QCL field is the target channel.

After determining the target channel indicated by the first TCI state, the beam direction corresponding to the target channel may be determined based on the source RS information for indicating beam directions.

In detail, the beam direction of the target channel may be determined based on the beam direction of the source RS for indicating beam directions. Alternatively, the beam direction of the source RS may be determined as the beam direction corresponding to the target channel.

For example, if the target channel is the uplink data channel and the uplink control channel, the beam direction of the source RS may be determined as the beam direction corresponding to the uplink data channel and the uplink control channel. Alternatively, if the target channel is the downlink data channel and the downlink control channel, the beam direction of the source RS may be determined as the beam direction corresponding to the downlink data channel and the downlink control channel. Alternatively, if the target channel is the uplink data channel, the uplink control channel, the downlink data channel, and the downlink control channel, the beam direction of the source RS can be determined as the beam direction corresponding to the uplink data channel, the uplink control channel, the downlink data channel and the downlink control channel.

In embodiments, the information field of the first TCI state may also include M QCL fields and N IDs for indicating types of channels to which the M QCL fields belong. The channel types to which the M QCL fields belong may be determined based on the N IDs in the information field, and the target channel indicated by the first TCI state may be determined based on the channel types to which the M QCL fields belong.

For example, if the channel type to which the M QCL fields belong is the uplink channel, the target channel indicated by the first TCI state is the uplink channel. If the channel type to which the M QCL fields belong is the downlink channel, the target channel indicated by the first TCI state is the downlink channel. If the channel types to which the M QCL fields belong are the uplink channel and the downlink channel, the target channel indicated by the first TCI state is the uplink channel and the downlink channel.

Since each QCL field in the information field may have corresponding source RS information, the beam direction corresponding to the channel type to which each QCL field belongs is determined based on the source RS information for indicating beam directions corresponding to each QCL field.

According to the beam indication method of embodiments of the disclosure, the TCI state pool is configured for the terminal, and the information field of each TCI state in the TCI state pool at most includes two groups of source RS information for indicating beam directions. During beam indication, the TCI state ID to be used can be sent directly to the terminal, after which the terminal can determine the beam direction of the channel based on the TCI state ID, which simplifies the complexity of beam indication and reduces the signaling indication overheads.

In order to realize the above embodiments, embodiments of the disclosure also provide a terminal. FIG. 7 is a schematic diagram of a terminal of embodiments of the disclosure.

As shown in FIG. 7, the terminal includes: a transceiver 800, a processor 810, and a memory 820.

The memory 820 is configured to store computer programs. The transceiver 800 is configured to send and receive data under a control of the processor 810. The processor 810 is configured to read the computer programs stored in the memory 820 to perform the following operations:

receiving a beam indication message from a base station, in which the beam indication message includes a first TCI state ID;

obtaining a first TCI state corresponding to the first TCI state ID from a TCI state pool, in which an information field of the first TCI state at most includes two groups of source RS information for indicating beam directions; and determining a beam direction corresponding to an uplink channel and/or a downlink channel based on the source RS information for indicating beam directions.

The transceiver 800 is configured to receive and send data under the control of the processor 810.

In FIG. 7, the bus architecture may include any number of interconnected buses and bridges, specifically one or more processors represented by the processor 810 are connected to various memory circuits represented by the memory 820. The bus architecture may also be connected to various other circuits such as peripheral devices, voltage regulators, and power management circuits, which is well known in the art and will not be further described herein. The bus interface is provided as an interface. The transceiver 800 may be a plurality of elements, i.e., including a transmitter and a receiver, and provides units for communicating with various other devices over transmission mediums. These transmission mediums include transmission mediums such as a wireless channel, a wired channel, and an optical fiber cable. For different user devices, the user interface can also be interfaces need for external and internal connection to devices, and the connected devices include but are not limited to a keypad, a display, a speaker, a microphone, and a control lever.

The processor 810 is responsible for managing the bus architecture and usual processing, and the memory 820 can store the data used by the processor 810 in performing operations.

Optionally, the processor 810 may be a Central Processing Unit (CPU), an Application Specific Integrated Circuit (ASIC), a Field-Programmable Gate Array (FPGA), or Complex Programmable Logic Device (CPLD). Alternatively, the processor 810 can be a multi-core architecture.

The processor 810 is configured to execute any method provided in embodiments shown in FIGS. 1 to 6 of the disclosure by calling computer programs stored in the memory in accordance with the obtained executable instructions. The processor 810 and the memory 820 may also be physically arranged separately.

In a possible implementation of embodiments of the disclosure, the information field further includes at least one QCL field, and determining the beam direction corresponding to the uplink channel and/or the downlink channel based on the source RS information for indicating beam directions includes:

determining a target channel indicated by the first TCI state based on a state of each QCL field in the information field; and determining a beam direction corresponding to the target channel based on the source RS information for indicating beam directions.

In a possible implementation of embodiments of the disclosure, the information field further includes M QCL fields and N IDs for indicating types of channels to which the M QCL fields belong, M and N are positive integers and N is less than or equal to M, and determining the beam direction corresponding to the uplink channel and/or the downlink channel based on the source RS information includes:

determining a target channel indicated by the first TCI state based on the N IDs in the information field; and determining a beam direction corresponding to the target channel based on the source RS information for indicating beam directions.

In a possible implementation of embodiments of the disclosure, the processor 810 is further configured to read the computer programs in the memory 820 to perform the following operation:

receiving a TCI state pool configuration message from the base station, in which the TCI state pool configuration message includes an information field of each TCI state, and the information field of each TCI state at most includes two groups of source RS information for indicating beam directions.

In a possible implementation of embodiments of the disclosure, the source RS information for indicating beam directions in the information field of each TCI state of the TCI state pool configuration message is different, and/or, a channel type corresponding to the information field of each TCI state of the TCI state pool is different.

In a possible implementation of embodiments of the disclosure, the information field of each TCI state of the TCI state pool configuration message further includes K groups of uplink power control parameters corresponding to each uplink TCI state, and K is a positive integer.

In a possible implementation of embodiments of the disclosure, the TCI state pool configuration message includes at least one group of uplink power control parameters corresponding to each TCI state.

In a possible implementation of embodiments of the disclosure, the processor 810 is further configured to read the computer programs in the memory 820 to perform the following operation:

receiving an uplink power control parameter configuration message from the base station, in which the uplink power control parameter configuration message includes at least one group of uplink power control parameters.

In a possible implementation of embodiments of the disclosure, the processor 810 is further configured to read the computer programs in the memory 820 to perform the following operation:

receiving an uplink power control parameter configuration message from the base station, in which the uplink power control parameter configuration message includes at least one group of uplink power control parameters corresponding to each TCI state in the TCI state pool.

In a possible implementation of embodiments of the disclosure, the processor 810 is further configured to read the computer programs in the memory 820 to perform the following operation:

receiving an intermediate activation TCI state configuration message from the base station, in which the intermediate activation TCI state configuration message includes S TCI state IDs, and S is a positive integer less than or equal to T; and generating a set of intermediate activation TCI states by selecting S TCI states corresponding to the S TCI state IDs from the TCI state pool respectively.

In a possible implementation of embodiments of the disclosure, the processor 810 is further configured to read the computer programs in the memory 820 to perform the following operation:

receiving an uplink power control parameter activation message from the base station, in which the uplink power control parameter activation message includes an ID of at least one group of uplink power control parameters; and activating at least one group of uplink power control parameters corresponding to the ID of at least one group of uplink power control parameters;

in which the at least one group of uplink power control parameters after the activating is associated with TCI states in the set of intermediate activation TCI states.

In a possible implementation of embodiments of the disclosure, the processor 810 is further configured to read the computer programs in the memory 820 to perform the following operation:

associating each TCI state in the set of intermediate activation TCI states with an activated group of uplink power control parameters based on preset rules.

In a possible implementation of embodiments of the disclosure, the processor 810 is further configured to read the computer programs in the memory 820 to perform the following operation:

receiving an uplink power control parameter activation message from the base station, in which the uplink power control parameter activation message is configured to activate a group of uplink power control parameters associated with a second TCI state, and the second TCI state is a TCI state in the set of intermediate activation TCI states.

It should be noted that the above-mentioned terminal provided by embodiments of the disclosure is capable of realizing all the steps of the method described in embodiments of FIGS. 1 to 3 above, and achieving the same technical effect, and the same parts and beneficial effects of the method embodiments of the disclosure will not be specifically described herein.

In order to realize the above embodiments, the disclosure also provides a network-side device. FIG. 8 is a schematic diagram of a network-side device according to embodiments of the disclosure.

As shown in FIG. 8, the network-side device includes: a transceiver 900, a processor 910, and a memory 920.

The memory 920 is configured to store computer programs. The transceiver 900 is configured to send and receive data under a control of the processor 910. The processor 910 is configured to read the computer programs stored in the memory 920 to perform the following operations: determining a first TCI state, in which an information field of the first TCI state at most includes two groups of source RS information for indicating beam directions; and sending a beam indication message to a terminal, in which the beam indication message includes a first TCI state ID.

The transceiver 900 is configured to receive and send data under a control of the processor 910.

In FIG. 8, the bus architecture may include any number of interconnected buses and bridges, specifically one or more processors represented by the processor 910 are connected to various memory circuits represented by the memory 920. The bus architecture may also be connected to various other circuits such as peripheral devices, voltage regulators, and power management circuits, which is well known in the art and will not be further described herein. The bus interface is provided as an interface. The transceiver 900 may be a plurality of elements, i.e., including a transmitter and a receiver, and provides units for communicating with various other devices over transmission mediums. These transmission mediums include transmission mediums such as a wireless channel, a wired channel, and an optical fiber cable. The processor 910 is responsible for managing the bus architecture and the usual processing, and the memory 920 can store the data used by the processor 910 in performing its operations.

The processor 910 may be a CPU, an ASIC, a FPGA, or a CPLD. The processor 910 can also adopt a multi-core architecture.

In a possible implementation of embodiments of the disclosure, determining the first TCI state includes:

determining a state of each QCL field in the information field of the first TCI state.

In a possible implementation of embodiments of the disclosure, determining the first TCI state includes:

determining a number of QCL fields contained in the information field of the first TCI state and corresponding QCL field IDs.

In a possible implementation of embodiments of the disclosure, the processor 910 is further configured to read the computer programs in the memory 920 to perform the following operation:

sending a TCI state pool configuration message to the terminal, in which the TCI state pool configuration message includes an information field of each TCI state, and each TCI state at most includes two groups of source RS information for indicating beam directions.

In a possible implementation of embodiments of the disclosure, the source RS information for indicating beam directions in the information field of each TCI state of the TCI state pool configuration message is different, and/or, a channel type corresponding to the information field of each TCI state of the TCI state pool is different.

In a possible implementation of embodiments of the disclosure, the information field of each TCI state of the TCI state pool configuration message further includes K groups of uplink power control parameters corresponding to each uplink TCI state, and K is a positive integer.

In a possible implementation of embodiments of the disclosure, the TCI state pool configuration message includes at least one group of uplink power control parameters corresponding to each TCI state.

In a possible implementation of embodiments of the disclosure, the processor 910 is further configured to read the computer programs in the memory 920 to perform the following operation:

sending an uplink power control parameter configuration message to the terminal, in which the uplink power control parameter configuration message includes at least one group of uplink power control parameters.

In a possible implementation of embodiments of the disclosure, the processor 910 is further configured to read the computer programs in the memory 920 to perform the following operation:

sending an uplink power control parameter configuration message to the terminal, in which the uplink power control parameter configuration message includes at least one group of uplink power control parameters corresponding to each TCI state in the TCI state pool.

In a possible implementation of embodiments of the disclosure, the processor 910 is further configured to read the computer programs in the memory 920 to perform the following operation:

sending an intermediate activation TCI state configuration message to the terminal, in which the intermediate activation TCI state configuration message includes S TCI state IDs, and S is a positive integer less than or equal to T.

In a possible implementation of embodiments of the disclosure, the processor 910 is further configured to read the computer programs in the memory 920 to perform the following operation:

sending an uplink power control parameter activation message to the terminal, in which the uplink power control parameter activation message includes an ID of at least one group of uplink power control parameters, and the at least one group of uplink power control parameters is associated with TCI states in the set of intermediate activation TCI states.

In a possible implementation of embodiments of the disclosure, the processor 910 is further configured to read the computer programs in the memory 920 to perform the following operation:

sending an uplink power control parameter activation message to the terminal, in which the uplink power control parameter activation message is configured to activate a group of uplink power control parameters associated with a second TCI state, and the second TCI state is a TCI state in the set of intermediate activation TCI states.

It should be noted that the above-mentioned network-side device provided by embodiments of the disclosure is capable of realizing all the steps of the method described in embodiments of FIGS. 4 to 6 above, and achieving the same technical effect, and the same parts and beneficial effects of the method embodiments of the disclosure will not be specifically described herein.

Figures 9, 10:
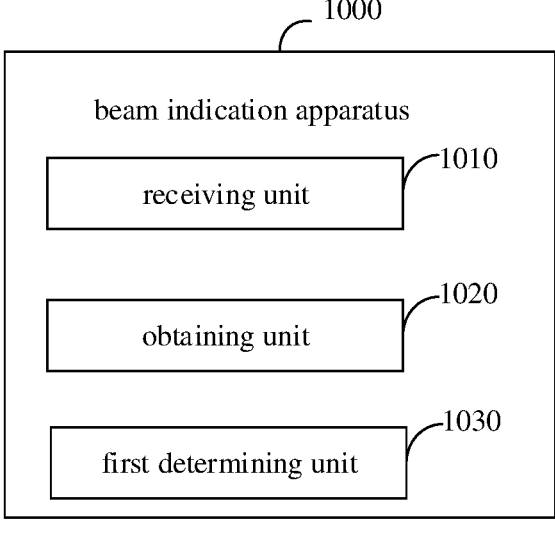
FIG. 9 is a schematic diagram of a beam indication apparatus according to embodiments of the disclosure.
FIG. 10 is a schematic diagram of a beam indication apparatus according to embodiments of the disclosure.

In order to realize the above embodiments, embodiments of the disclosure also provide a beam indication apparatus. FIG. 9 is a schematic diagram of a beam indication apparatus according to embodiments of the disclosure.

As shown in FIG. 9, the beam indication apparatus 100 includes: a receiving unit 1010, an obtaining unit 1020, and a first determining unit 1030.

The receiving unit 1010 is configured to receive a beam indication message from a base station, in which the beam indication message includes a first TCI state ID.

The obtaining unit 1020 is configured to obtain a first TCI state corresponding to the first TCI state ID from a TCI state pool, in which an information field of the first TCI state at most includes two groups of source RS information for indicating beam directions.

The first determining unit 1030 is configured to determine a beam direction corresponding to an uplink channel and/or a downlink channel based on the source RS information for indicating beam directions.

In a possible implementation of embodiments of the disclosure, the information field further includes at least one QCL field, and the determining unit 1030 is further configured to:

determine a target channel indicated by the first TCI state based on a state of each QCL field in the information field; and determine a beam direction corresponding to the target channel based on the source RS information for indicating beam directions.

In a possible implementation of embodiments of the disclosure, the information field further includes M QCL fields and N IDs for indicating types of channels to which the M QCL fields belong, M and N are positive integers and N is less than or equal to M, and the determining unit 1030 is further configured to:

determine a target channel indicated by the first TCI state based on the N IDs in the information field; and determine a beam direction corresponding to the target channel based on the source RS information for indicating beam directions.

In a possible implementation of embodiments of the disclosure, the information field further includes M QCL fields and N IDs for indicating types of channels to which the M QCL fields belong, M and N are positive integers and N is less than or equal to M, and the determining unit 1030 is further configured to:

determine a target channel indicated by the first TCI state based on the N IDs in the information field; and determine a beam direction corresponding to the target channel based on the source RS information for indicating beam directions.

In a possible implementation of embodiments of the disclosure, the receiving unit 1010 is further configured to: receive a TCI state pool configuration message from the base station, in which the TCI state pool configuration message includes an information field of each TCI state, and the information field of each TCI state at most includes two groups of source RS information for indicating beam directions.

In a possible implementation of embodiments of the disclosure, the source RS information for indicating beam directions in the information field of each TCI state of the TCI state pool configuration message is different, and/or, a channel type corresponding to the information field of each TCI state of the TCI state pool is different.

In a possible implementation of embodiments of the disclosure, the information field of each TCI state of the TCI state pool configuration message further includes K groups of uplink power control parameters corresponding to each uplink TCI state, and K is a positive integer.

In a possible implementation of embodiments of the disclosure, the TCI state pool configuration message includes at least one group of uplink power control parameters corresponding to each TCI state.

In a possible implementation of embodiments of the disclosure, the receiving unit 1010 is further configured to: receive an uplink power control parameter configuration message from the base station, in which the uplink power control parameter configuration message includes at least one group of uplink power control parameters.

In a possible implementation of embodiments of the disclosure, the receiving unit 1010 is further configured to: receive an uplink power control parameter configuration message from the base station, in which the uplink power control parameter configuration message includes at least one group of uplink power control parameters corresponding to each TCI state in the TCI state pool.

In a possible implementation of embodiments of the disclosure, the receiving unit 1010 is further configured to: receive an intermediate activation TCI state configuration message from the base station, in which the intermediate activation TCI state configuration message includes S TCI state IDs, and S is a positive integer less than or equal to T.

The apparatus further includes:

a generating unit, configured to generate a set of intermediate activation TCI states by selecting S TCI states corresponding to the S TCI state IDs from the TCI state pool respectively.

In a possible implementation of embodiments of the disclosure, the receiving unit 1010 is further configured to: receive an uplink power control parameter activation message from the base station, in which the uplink power control parameter activation message includes an ID of at least one group of uplink power control parameters.

The apparatus further includes:

an activating unit, configured to activate at least one group of uplink power control parameters corresponding to the ID of at least one group of uplink power control parameters.

The at least one group of uplink power control parameters after the activating is associated with TCI states in the set of intermediate activation TCI states.

In a possible implementation of embodiments of the disclosure, the apparatus further includes:

an associating unit, configured to associate each TCI state in the set of intermediate activation TCI states with an activated group of uplink power control parameters based on preset rules.

In a possible implementation of embodiments of the disclosure, the receiving unit 1010 is further configured to: receive an uplink power control parameter activation message from the base station, in which the uplink power control parameter activation message is configured to activate a group of uplink power control parameters associated with a second TCI state, and the second TCI state is a TCI state in the set of intermediate activation TCI states.

It should be noted that the explanatory description of the aforementioned embodiments of the beam indication method are also applicable to the beam indication apparatus of the embodiments, which is not repeated herein.

With the beam indication apparatus of embodiments of the disclosure, the beam indication message is received from the base station, in which the beam indication message includes the first TCI state ID. The first TCI state corresponding to the first TCI state ID is obtained from the TCI state pool, in which the information field of the first TCI state at most includes two groups of source RS information for indicating beam directions. The beam direction corresponding to the uplink channel and/or the downlink channel is determined based on the source RS information for indicating beam directions. Therefore, according to the source RS information for indicating beam directions of each TCI state in the TCI state pool, the uplink channel common beam, the downlink channel common beam, or the same or different common beams of the upstream and downstream channels are indicated, thereby simplifying the complexity of beam indication and reducing the signaling indicating overheads.

In order to realize the above embodiments, embodiments of the disclosure also provide a beam indication apparatus. FIG. 10 is a schematic diagram of a beam indication apparatus according to embodiments of the disclosure.

As shown in FIG. 10, the beam indication apparatus 1100 includes: a second determining unit 1110 and a sending unit 1120.

The second determining unit 1110 is configured to determine a first TCI state, in which an information field of the first TCI state at most includes two groups of source RS information for indicating beam directions.

The sending unit 1120 is configured to send a beam indication message to a terminal, in which the beam indication message includes a first TCI state ID.

In a possible implementation of embodiments of the disclosure, the second determining unit 1110 is further configured to:

determine a state of each QCL field in the information field of the first TCI state.

In a possible implementation of embodiments of the disclosure, the sending unit 1120 is configured to: determine a number of QCL fields contained in the information field of the first TCI state and corresponding QCL field IDs.

In a possible implementation of embodiments of the disclosure, the sending unit 1120 is configured to: send a TCI state pool configuration message to the terminal, in which the TCI state pool configuration message includes an information field of each TCI state, and each TCI state at most includes two groups of source RS information for indicating beam directions.

In a possible implementation of embodiments of the disclosure, the source RS information for indicating beam directions in the information field of each TCI state of the TCI state pool configuration message is different, and/or, a channel type corresponding to the information field of each TCI state of the TCI state pool is different.

In a possible implementation of embodiments of the disclosure, the information field of each TCI state of the TCI state pool configuration message further includes K groups of uplink power control parameters corresponding to each uplink TCI state, and K is a positive integer.

In a possible implementation of embodiments of the disclosure, the TCI state pool configuration message includes at least one group of uplink power control parameters corresponding to each TCI state.

In a possible implementation of embodiments of the disclosure, the sending unit 1120 is configured to: send an uplink power control parameter configuration message to the terminal, in which the uplink power control parameter configuration message includes at least one group of uplink power control parameters.

In a possible implementation of embodiments of the disclosure, the sending unit 1120 is configured to: send an uplink power control parameter configuration message to the terminal, in which the uplink power control parameter configuration message includes at least one group of uplink power control parameters corresponding to each TCI state in the TCI state pool.

In a possible implementation of embodiments of the disclosure, the sending unit 1120 is configured to: send an intermediate activation TCI state configuration message to the terminal, in which the intermediate activation TCI state configuration message includes S TCI state IDs, and S is a positive integer less than or equal to T.

In a possible implementation of embodiments of the disclosure, the sending unit 1120 is configured to: send an uplink power control parameter activation message to the terminal, in which the uplink power control parameter activation message includes an ID of at least one group of uplink power control parameters, and the at least one group of uplink power control parameters is associated with TCI states in the set of intermediate activation TCI states.

In a possible implementation of embodiments of the disclosure, the sending unit 1120 is configured to: send an uplink power control parameter activation message to the terminal, in which the uplink power control parameter activation message is configured to activate a group of uplink power control parameters associated with a second TCI state, and the second TCI state is a TCI state in the set of intermediate activation TCI states.

It should be noted that the explanatory description of the aforementioned embodiments of the beam indication method applied to the terminal side are also applicable to the beam indication apparatus of the embodiments, which is not repeated herein.

With the beam indication apparatus of embodiments of the disclosure, the first TCI state is determined, in which the information field of the first TCI state at most includes two groups of source RS information for indicating beam directions. The beam indication message is sent to the terminal, in which the beam indication message includes the first TCI state ID. Therefore, the base station sends the beam indication message to the terminal, the information field of the first TCI state corresponding to the first TCI state ID in the beam indication message includes TCI state of source RS information for indicating beam directions, so that the beam direction corresponding to the uplink channel and/or the downlink channel indicated by a TCI state, thereby simplifying the complexity of beam indication and reducing the signaling indicating overheads.

It should be noted that each functional unit in each embodiment of the disclosure can be integrated in one processing unit, or each unit can be physically arranged separately, or two or more units can be integrated in one unit. The above integrated units can be implemented either in the form of hardware or in the form of software functional units.

The integrated units can be stored in a processor-readable storage medium if implemented as software functional units and sold or used as stand-alone products. On the basis, the technical solution of the disclosure in nature or the part that contributes to the related art or the whole or part of the technical solution can be implemented in the form of software products. The computer software product is stored in a storage medium and includes instructions used to cause a computer device (which may be a personal computer, a server, or a network-side device) or a processor to perform all or part of the steps of the method of each embodiment of the disclosure. The above-mentioned storage medium includes: a U disk, a portable hard disk, a Read-Only Memory (ROM), a Random Access Memory (RAM), a magnetic disk or an optical disc and other mediums for storing program codes.

In order to realize the above embodiments, the disclosure also provides a processor-readable storage medium.

The processor-readable storage medium stores computer programs that are used to enable the processor to perform the beam indication method described in embodiments of FIGS. 1 to 3 of the disclosure.

The processor-readable storage medium may be any available medium or data storage device that can be accessed by the processor, which includes but is not limited to a magnetic memory (such as a floppy disk, a hard disk, a magnetic tape, and a Magnetic Optical (MO)), an optical memory (such as a CD, a DVD, a BD, and a HVD), and a semiconductor memory (such as a ROM, an EPROM, an EEPROM, a non-transitory memory (NAND FLASH), and a Solid State Drive (SSD)).

In order to realize the above embodiments, the disclosure also provides a processor-readable storage medium.

The processor-readable storage medium stores computer programs that are used to enable the processor to perform the beam indication method described in embodiments of FIGS. 4 to 6 of the disclosure.

The processor-readable storage medium may be any available medium or data storage device that can be accessed by the processor, which includes but is not limited to a magnetic memory (such as a floppy disk, a hard disk, a magnetic tape, and a MO), an optical memory (such as a CD, a DVD, a BD, and a HVD), and a semiconductor memory (such as a ROM, an EPROM, an EEPROM, a NAND FLASH, and a SSD).

Those skilled in the art should understand that the embodiments of the disclosure may provide a method, a system, or a computer program product. Therefore, the disclosure may provide the embodiment in the form of entire hardware, the embodiment in the form of entire software, or the embodiment in the form of software and hardware. Moreover, the disclosure may take the form of a computer program product implemented on one or more computer-usable storage mediums (including, but not limited to, a disk memory and an optical memory) that contain computer-usable program codes therein.

The disclosure is described with reference to the flow-charts and/or the block diagrams of the methods, the devices (systems), and the computer program products according to the embodiments of the disclosure. It is understood that each process and/or box in the flowchart and/or block diagram, and the combination of processes and/or boxes in the flowchart and/or the block diagram, may be implemented by the computer-executable instructions. These computer executable instructions may be provided to a processor of a general computer, a specialized computer, an embedded processor, or other programmable data processing device to produce a machine, such that the instructions executed by the processor of the computer or other programmable data processing device can produce a device for implementing the functions specified in one or more processes of the flowchart and/or one or more boxes of the block diagram.

These processor-executable instructions may also be stored in a processor-readable memory capable of directing a computer or other programmable data processing device to operate in a particular manner, such that the instructions stored in the processor-readable memory produce an article of manufacture including a command device. The command device implements the functions specified in one or more processes of the flowchart and/or one or more boxes of the block diagram.

These processor-executable instructions may also be loaded onto a computer or other programmable data processing device, such that a series of operational steps are performed on the computer or other programmable device to produce computer-implemented processing. The instructions executed on the computer or other programmable device provide steps for implementing the functions specified in one or more processes of the flowchart and/or one or more boxes of the block diagram.

Obviously, those skilled in the art can make various changes and variations to this application without departing from the spirit and scope of this application. Therefore, if these modifications and variations of this application are within the scope of the claims of this application and its equivalent technology, this application is also intended to include these modifications and variations.

What is claimed is:

1. A beam indication method, comprising:
receiving a beam indication message from a base station, wherein the beam indication message comprises a first transmission configuration indication (TCI) state ID;
obtaining a first TCI state corresponding to the first TCI state ID from a TCI state pool, wherein an information field of the first TCI state at most comprises two groups of source reference signal information for indicating beam directions; and
determining a beam direction corresponding to an uplink channel and/or a downlink channel based on the source reference signal information for indicating beam directions;
wherein the method further comprises:
receiving a TCI state pool configuration message from the base station, wherein the TCI state pool configuration message comprises an information field of each TCI state, and the information field of each TCI state at most comprises two groups of source reference signal information for indicating beam directions;
receiving an intermediate activation TCI state configuration message from the base station, wherein the intermediate activation TCI state configuration message comprises S TCI state IDs, the TCI state pool comprises T TOI states, and S is a positive integer and is less than or equal to T; and
selecting S TCI states corresponding to the S TOI state IDs from the TCI state pool respectively.

2. The method of claim 1, wherein the information field further comprises at least one quasi co-location (QCL) field, and determining the beam direction corresponding to the uplink channel and/or the downlink channel based on the source reference signal information for indicating beam directions comprises:
determining a target channel indicated by the first TCI state based on a state of each QCL field in the information field; and
determining a beam direction corresponding to the target channel based on the source reference signal information for indicating beam directions.

3. The method of claim 1, wherein the information field further comprises M QCL fields and N IDs for indicating types of channels to which the M QCL fields belong, M and N are positive integers and N is less than or equal to M, and determining the beam direction corresponding to the uplink channel and/or the downlink channel based on the source reference signal information comprises:
determining a target channel indicated by the first TCI state based on the N IDs in the information field; and
determining a beam direction corresponding to the target channel based on the source reference signal information for indicating beam directions.

4. The method of claim 1, wherein the source reference signal information for indicating beam directions in the information field of each TCI state of the TCI state pool configuration message is different, and/or, a channel type corresponding to the information field of each TCI state of the TCI state pool is different.

5. The method of claim 1, wherein the information field of each TCI state of the TCI state pool configuration message further comprises K groups of uplink power control parameters corresponding to each uplink TCI state, and K is a positive integer.

6. The method of claim 1, wherein the TCI state pool configuration message comprises at least one group of uplink power control parameters corresponding to each TCI state.

7. The method of claim 1, further comprising:
receiving an uplink power control parameter configuration message from the base station, wherein the uplink power control parameter configuration message comprises at least one group of uplink power control parameters.

8. The method of claim 1, further comprising:
receiving an uplink power control parameter configuration message from the base station, wherein the uplink power control parameter configuration message comprises at least one group of uplink power control parameters corresponding to each TCI state in the TCI state pool.

9. The method of claim 1, further comprising:
receiving an uplink power control parameter activation message from the base station, wherein the uplink power control parameter activation message comprises an ID of at least one group of uplink power control parameters; and
activating at least one group of uplink power control parameters corresponding to the ID of at least one group of uplink power control parameters;
wherein the at least one group of uplink power control parameters after the activating is associated with TCI states in the S TCI states corresponding to the S TCI state IDs.

10. The method of claim 9, further comprising:
associating each TCI state in the S TCI states corresponding to the S TCI state IDs with an activated group of uplink power control parameters based on preset rules.

11. The method of claim 1, further comprising:
receiving an uplink power control parameter activation message from the base station, wherein the uplink power control parameter activation message is configured to activate a group of uplink power control parameters associated with a second TCI state, and the second TCI state is a TCI state in the S TCI states corresponding to the S TCI state IDs.

12. A beam indication method, comprising:
determining a first TCI state, wherein an information field of the first TCI state at most comprises two groups of source reference signal information for indicating beam directions; and
sending a beam indication message to a terminal, wherein the beam indication message comprises a first TCI state ID;
wherein the method further comprises:
sending a TCI state pool configuration message to the terminal, wherein the TCI state pool configuration message comprises an information field of each TCI state, and each TCI state at most comprises two groups of source reference signal information for indicating beam directions;
sending an intermediate activation TCI state configuration message to the terminal, to enable the terminal to select S TOI states corresponding to S TCI state IDs from the TCI state pool respectively, wherein the intermediate activation TOI state configuration message comprises the S TCI state IDs, the TCI state pool comprises T TCI states, and S is a positive integer and is less than or equal to T.

13. The method of claim 12, wherein determining the first TCI state comprises:

determining a state of each QCL field in the information field of the first TCI state; or determining a number of QCL fields contained in the information field of the first TCI state and corresponding QCL field IDs.

14. The method of claim 12, wherein the source reference signal information for indicating beam directions in the information field of each TCI state of the TCI state pool configuration message is different, and/or, a channel type corresponding to the information field of each TCI state of the TCI state pool is different;

wherein the information field of each TCI state of the TCI state pool configuration message further comprises K groups of uplink power control parameters corresponding to each uplink TCI state, and K is a positive integer; or the TCI state pool configuration message comprises at least one group of uplink power control parameters corresponding to each TCI state.

15. The method of claim 12, further comprising:

sending an uplink power control parameter configuration message to the terminal, wherein the uplink power control parameter configuration message comprises at least one group of uplink power control parameters; or sending an uplink power control parameter configuration message to the terminal, wherein the uplink power control parameter configuration message comprises at least one group of uplink power control parameters corresponding to each TCI state in the TCI state pool; or sending an intermediate activation TCI state configuration message to the terminal, wherein the intermediate activation TCI state configuration message comprises S TCI state IDs, the TCI state pool comprises T TCI states, and S is a positive integer and is less than or equal to T.

16. A terminal comprising: a memory, a transceiver, and a processor, wherein the memory is configured to store computer programs, the transceiver is configured to send and receive data under a control of the processor, and the processor is configured to read the computer programs stored in the memory to perform the following operations:

receiving a beam indication message from a base station, wherein the beam indication message comprises a first TCI state ID;

obtaining a first TCI state corresponding to the first TCI state ID from a TCI state pool, wherein an information field of the first TCI state at most comprises two groups of source reference signal information for indicating beam directions; and determining a beam direction corresponding to an uplink channel and/or a downlink channel based on the source reference signal information for indicating beam directions;

wherein the processor is further configured to read the computer programs stored in the memory to perform:

receiving a TCI state pool configuration message from the base station, wherein the TCI state pool configuration message comprises an information field of each TOI state, and the information field of each TCI state at most comprises two groups of source reference signal information for indicating beam directions;

receiving an intermediate activation TCI state configuration message from the base station, wherein the intermediate activation TOI state configuration message comprises S TCI state IDs, the TCI state pool comprises T TCI states, and S is a positive integer and is less than or equal to T; and selecting S TCI states corresponding to the S TCI state IDs from the TCI state pool respectively.

17. A network-side device comprising: a memory, a transceiver and a processor, wherein the memory is configured to store computer programs, the transceiver is configured to send and receive data under a control of the processor, and the processor is configured to read the computer programs stored in the memory to perform the following operations:

determining a first TCI state, wherein an information field of the first TCI state at most comprises two groups of source reference signal information for indicating beam directions; and sending a beam indication message to a terminal, wherein the beam indication message comprises a first TCI state ID;

wherein the processor is further configured to read the computer programs stored in the memory to perform:

sending a TOI state pool configuration message to the terminal, wherein the TCI state pool configuration message comprises an information field of each TCI state, and each TCI state at most comprises two groups of source reference signal information for indicating beam directions;

sending an intermediate activation TOI state configuration message to the terminal, to enable the terminal to select S TCI states corresponding to S TOI state IDs from the TOI state pool respectively, wherein the intermediate activation TCI state configuration message comprises the S TCI state IDs, the TCI state pool comprises T TCI states, and S is a positive integer and is less than or equal to T.

* * * * *